United States Patent
Suzuki et al.

(10) Patent No.: US 8,947,731 B2
(45) Date of Patent: Feb. 3, 2015

(54) IMAGING UNIT, COLOR MEASURING DEVICE, IMAGE FORMING APPARATUS, COLOR MEASURING SYSTEM, AND COLOR MEASURING METHOD

(71) Applicants: Yasuyuki Suzuki, Kanagawa (JP); Nobuyuki Satoh, Kanagawa (JP); Mamoru Yorimoto, Kanagawa (JP); Suguru Yokozawa, Kanagawa (JP); Yuichi Sakurada, Tokyo (JP); Masato Kobayashi, Kanagawa (JP); Tatsuhiko Okada, Saitama (JP); Tomokazu Kanzawa, Saitama (JP); Daisaku Horikawa, Saitama (JP); Hiroshi Matsumoto, Saitama (JP); Ryo Honda, Kanagawa (JP); Makoto Moriwaki, Kanagawa (JP)

(72) Inventors: Yasuyuki Suzuki, Kanagawa (JP); Nobuyuki Satoh, Kanagawa (JP); Mamoru Yorimoto, Kanagawa (JP); Suguru Yokozawa, Kanagawa (JP); Yuichi Sakurada, Tokyo (JP); Masato Kobayashi, Kanagawa (JP); Tatsuhiko Okada, Saitama (JP); Tomokazu Kanzawa, Saitama (JP); Daisaku Horikawa, Saitama (JP); Hiroshi Matsumoto, Saitama (JP); Ryo Honda, Kanagawa (JP); Makoto Moriwaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/835,823

(22) Filed: Mar. 15, 2013

(65) Prior Publication Data

US 2013/0242319 A1    Sep. 19, 2013

(30) Foreign Application Priority Data

Mar. 16, 2012 (JP) ................................. 2012-060555
Feb. 14, 2013 (JP) ................................. 2013-027145

(51) Int. Cl.
| G06K 15/02 | (2006.01) |
| H04N 1/46 | (2006.01) |
| G03F 3/08 | (2006.01) |
| H04N 1/407 | (2006.01) |

(52) U.S. Cl.
CPC .............. *G06K 15/02* (2013.01); *H04N 1/4076* (2013.01)
USPC .............................. 358/1.9; 358/504; 358/518

(58) Field of Classification Search
USPC ................... 358/1.9, 504, 518; 382/100, 141; 606/11
See application file for complete search history.

(56) References Cited

U.S. PATENT DOCUMENTS

| 7,676,061 B2 * | 3/2010 | Harrison et al. .............. 382/100 |
| 2012/0069411 A1 | 3/2012 | Satoh et al. |
| 2013/0027720 A1 | 1/2013 | Satoh |
| 2013/0027721 A1 | 1/2013 | Kobayashi et al. |

FOREIGN PATENT DOCUMENTS

| CN | 1934850 A | 3/2007 |
| JP | 05-223642 | 8/1993 |
| JP | 2000-346707 | 12/2000 |
| JP | 2002-320232 | 10/2002 |
| JP | 2005-266238 | 9/2005 |
| JP | 2008-018610 | 1/2008 |

OTHER PUBLICATIONS

U.S. Appl. No. 13/687,520, filed Nov. 28, 2012, Satoh, et al.

(Continued)

*Primary Examiner* — Charlotte M Baker
(74) *Attorney, Agent, or Firm* — Oblon, Spivak, McClelland, Maier & Neustadt, L.L.P.

(57) ABSTRACT

An imaging unit includes a frame having an opening; a sensor unit that captures, via the opening, a subject located outside the frame; a reference chart unit that is arranged on the frame and is captured by the sensor unit together with the subject; and a cover member that covers the opening.

11 Claims, 33 Drawing Sheets

(56) References Cited

OTHER PUBLICATIONS

U.S. Appl. No. 13/780,340, filed Feb. 28, 2013, Yokozawa.
U.S. Appl. No. 13/800,001, filed Mar. 13, 2013, Matsumoto, et al.
U.S. Appl. No. 13/838,262, filed Mar. 15, 2013, Suzuki, et al.
U.S. Appl. No. 13/845,964, filed Mar. 18, 2013, Okada, et al.
Chinese Office Action issued Aug. 4, 2014, in China Patent application No. 201310082469.X (with English translation).

* cited by examiner

MEMORY TABLE Tb1

INITIAL REFERENCE RGB VALUE (RdGdBd) ⟨125

| PATCH NUMBER | Rd | Gd | Bd | Ld | ad | bd | xd | yd | zd |
|---|---|---|---|---|---|---|---|---|---|
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| | | | | | | | | | |
| ... | | | | | | | | | |
| 72 | | | | | | | | | |

IMAGING UNIT, COLOR MEASURING DEVICE, IMAGE FORMING APPARATUS, COLOR MEASURING SYSTEM, AND COLOR MEASURING METHOD

CROSS-REFERENCE TO RELATED APPLICATIONS

The present application claims priority to and incorporates by reference the entire contents of Japanese Patent Application No. 2012-060555 filed in Japan on Mar. 16, 2012 and Japanese Patent Application No. 2013-027145 filed in Japan on Feb. 14, 2013.

BACKGROUND OF THE INVENTION

1. Field of the Invention

The present invention relates to an imaging unit, a color measuring device, an image forming apparatus, a color measuring system, and a color measuring method.

2. Description of the Related Art

An image forming apparatus, such as a color inkjet image forming apparatus or a color electrophotographic image forming apparatus, is becoming able to provide a higher image quality and is thus increasingly used for offset printing of advertising media, brochures, or the like, for which high-quality images are required although the number of copies to be printed is relatively small.

In the offset printing that requires a high image quality, in some cases, colors actually printed out by the image forming apparatus may differ from colors of a printing material desired by a customer.

In general, the customer checks the colors of the printing material on a display and then orders printing. However, the image forming apparatus has specific color reproduction characteristics according to each model, so that printed colors may differ from the colors checked on the display.

Therefore, a technology has been adopted to reproduce colors by using a color space such as the L*a*b* color space or the xyz color space that is independent of a device such as a display or an image forming apparatus.

The image forming apparatus controls the amount of color materials in order to output a designated color. For example, an inkjet image forming apparatus calculates an ink ejection amount or a print pattern to control the amount of ink ejected from an ink head, thereby controlling output colors. For another example, an electrophotographic image forming apparatus controls the amount of toner attached to a photoreceptor or controls the intensity of a laser beam, thereby controlling output colors.

However, the amount of color materials, such as the ink ejection amount of the inkjet image forming apparatus, varies depending on the state of a head nozzle, depending on a variation in the viscosity of ink, or depending on a variation in an ejection driving element (e.g., a piezoelectric element), resulting in a variation in the color reproducibility. Moreover, the ink ejection amount of the inkjet image forming apparatus may change over time in the same image forming apparatus or may vary between different image forming apparatuses. Therefore, the color reproducibility of an image varies over time or between image forming apparatuses.

Therefore, a conventional image forming apparatus performs a color adjustment process to reduce a variation in an output due to device-specific characteristics and improve the reproducibility of the output with respect to an input. For example, the color adjustment process is performed such that the image forming apparatus actually outputs a color patch image of a reference color (a reference color patch image) and a color measuring device measures the reference color patch image. The color measuring device generates a color conversion parameter based on a difference between a color measurement value of the reference color patch image and a color value of a corresponding reference color in the standard color space, and sets the color conversion parameter in the image forming apparatus. Thereafter, when outputting an image based on input image data, the image forming apparatus performs color conversion on the input image data based on the set color conversion parameter, and records or outputs an image based on the color-converted image data. Therefore, it is possible to prevent a variation in an output due to device-specific characteristics and output an image with higher color reproducibility.

In the conventional color adjustment process, a spectrophotometric color measuring device has widely been used as a color measuring device that measures colors of the reference color patch image. The spectrophotometric color measuring device can obtain the spectral reflectivity at each wavelength and thus can measure colors with high accuracy. However, the spectrophotometric color measuring device is expensive. Therefore, there is a need for a device that can perform color measurement with higher accuracy at lower costs.

Conventionally, a color measuring device has been proposed that includes a reference color measuring unit that measures a reference color patch in advance to obtain RGB data of a color reference value, a color image input unit that obtains RGB data by simultaneously or separately capturing a subject including the reference color patch and a color measurement target, an image extracting unit that extracts RGB data of the reference color patch and RGB data of the color measurement target from the RGB data obtained by the color image input unit, and a calculating unit that calculates a difference between the RGB data of the reference color patch obtained by the image extracting unit and the RGB data of the reference color patch obtained by the reference color measuring unit, and corrects at least the RGB data of the color measurement target based on the difference (see Japanese Patent No. 3129502). In the conventional technology, it is disclosed that a reference color patch to be compared with a subject being a color measurement target is placed near the subject, the subject and the reference color patch are simultaneously captured by a color video camera serving as the color image input unit, RGB data of the subject is corrected by using RGB data of the captured reference color patch, and the RGB data of the subject is converted to a color value in the standard color space.

However, in the technology described in Japanese Patent No. 3129502, it is difficult to maintain a constant positional relation among a subject, the reference color patch, and the color video camera. Therefore, imaging conditions may vary at every imaging and the imaging may not be performed stably.

Therefore, there is a need for an imaging unit, a color measuring device, an image forming apparatus, a color measuring system, and a color measuring method capable of stably capturing images.

SUMMARY OF THE INVENTION

According to an embodiment, there is provided an imaging unit that includes a frame having an opening; a sensor unit that captures, via the opening, a subject located outside the frame; a reference chart unit that is arranged on the frame and is captured by the sensor unit together with the subject; and a cover member that covers the opening.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. The embodiments described below are preferred embodiments of the present invention and various technically-preferred limitations are made. However, the present invention is not unreasonably limited by the explanation below. Besides, not all components explained in the embodiments below are always needed as the components of the present invention.

In the following explanation, "Lab (a Lab value)" means, for example, a CIELAB (CIE 1976 L*a*b) color space (or a value in the CIELAB color space). For convenience of explanation, "L*a*b*" will be described as "Lab" below.

FIG. 1 to FIG. 34 are diagrams illustrating an imaging unit, a color measuring device, an image forming apparatus, a color measuring system, and a color measuring method according to an embodiment of the present invention. Specifically, FIG. 1 is a schematic perspective view of an image forming apparatus 1 to which the imaging unit, the color measuring device, the image forming apparatus, the color measuring system, and the color measuring method according to the embodiment of the present invention are applied.

Figure 1:
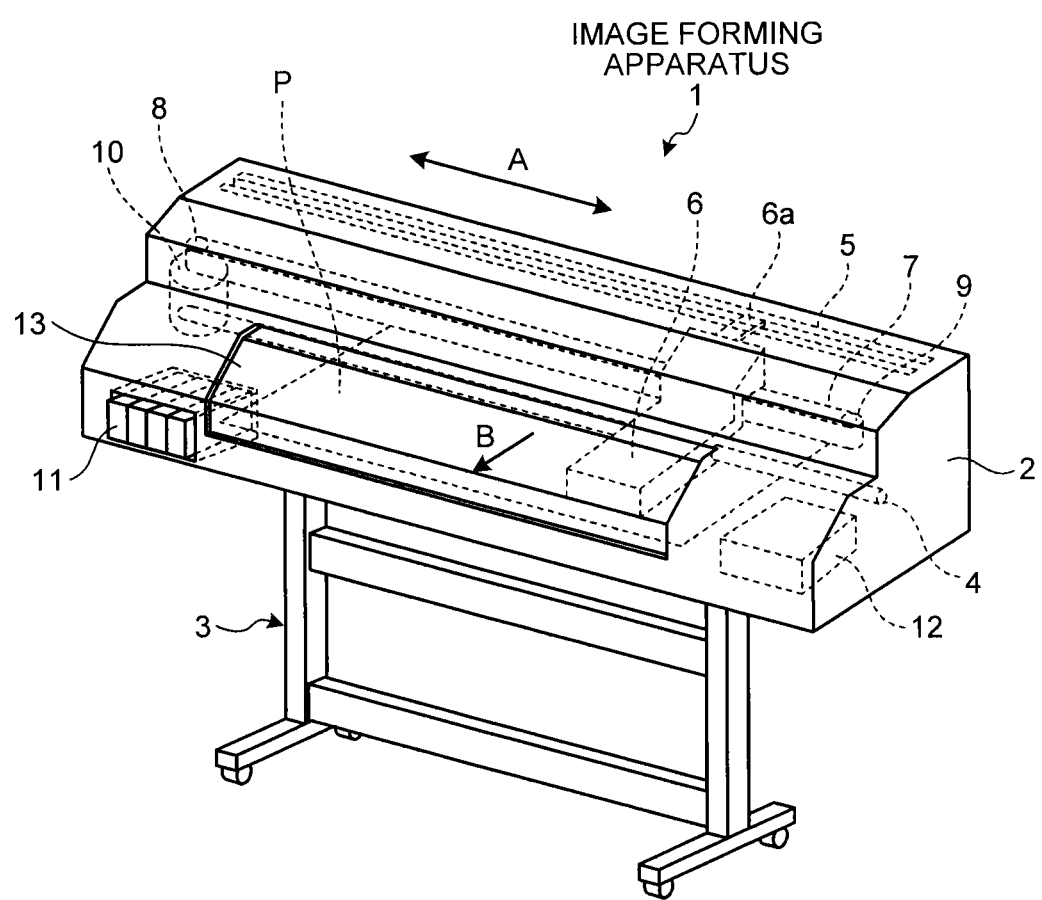
FIG. 1 is a schematic perspective view of an image forming apparatus according to an embodiment of the present invention.

In FIG. 1, the image forming apparatus 1 includes a main-body housing 2 mounted on a main-body frame 3. In the main-body housing 2, a main guide rod 4 and a sub guide rod 5 are extended in the main-scanning direction indicated by a double-headed arrow A in FIG. 1. The main guide rod 4 supports a carriage 6 in a movable manner. The carriage 6 includes a connection piece 6a that is engaged with the sub guide rod 5 to stabilize the posture of the carriage 6. The image forming apparatus 1 includes a timing belt 7 in the form of an endless belt along the main guide rod 4. The timing belt 7 is stretched between a drive pulley 8 and a driven pulley 9. The drive pulley 8 is driven to rotate by a main-scanning motor 10. The driven pulley 9 is arranged so as to give a predetermined tension to the timing belt 7. The drive pulley 8 is driven to rotate by the main-scanning motor 10 to thereby rotate the timing belt 7 in the main-scanning direction according to the rotation direction.

The carriage 6 is connected to the timing belt 7 and moves back and forth in the main-scanning direction along the main guide rod 4 while the timing belt 7 is rotated in the main-scanning direction by the drive pulley 8.

The image forming apparatus 1 includes a cartridge section 11 and a maintenance mechanism 12, which are housed at both corner portions of the main-body housing 2 in the main-scanning direction. The cartridge section 11 houses cartridges containing ink of respective colors of yellow (Y), magenta (M), cyan (C), and black (K) in a replaceable manner. The cartridges in the cartridge section 11 are connected to recording heads 20y, 20m, 20c, and 20k for the respective colors (see FIG. 2) of a recording head 20 on the carriage 6 by pipes (not illustrated). Each of the cartridges supplies ink to a corresponding one of the recording heads 20y, 20m, 20c, and 20k through the pipe. In the following explanation, the recording heads 20y, 20m, 20c, and 20k may be collectively referred to as the recording head 20.

The image forming apparatus 1 outputs or records an image on a recording medium P by ejecting ink to the recording medium P that is intermittently conveyed in the sub-scanning direction (an arrow B direction in FIG. 1) perpendicular to the main-scanning direction on a platen 14 (see FIG. 2) while moving the carriage 6 in the main-scanning direction as described below.

Specifically, the image forming apparatus 1 according to the embodiment intermittently conveys the recording medium P in the sub-scanning direction, and, while the conveyance of the recording medium P in the sub-scanning direction is suspended, ejects ink from a nozzle array of the recording head 20 mounted on the carriage 6 onto the recording medium P on the platen 14 by moving the carriage 6 in the main-scanning direction, thereby forming an image on the recording medium P.

The maintenance mechanism 12 cleans an ejection surface of the recording head 20, performs capping, or ejects unnecessary ink in order to discharge unnecessary ink from the recording head 20 or maintain the reliability of the recording head 20. A specific example of the maintenance mechanism 12 will be described later.

The image forming apparatus 1 includes a cover 13 that can be opened and closed at a conveying section of the recording medium P. When a maintenance operation is performed on the image forming apparatus 1 or a jam occurs in the image forming apparatus 1, the cover 13 is opened to perform maintenance of the interior of the main-body housing 2 or to remove a jammed recording medium P.

Figure 2:
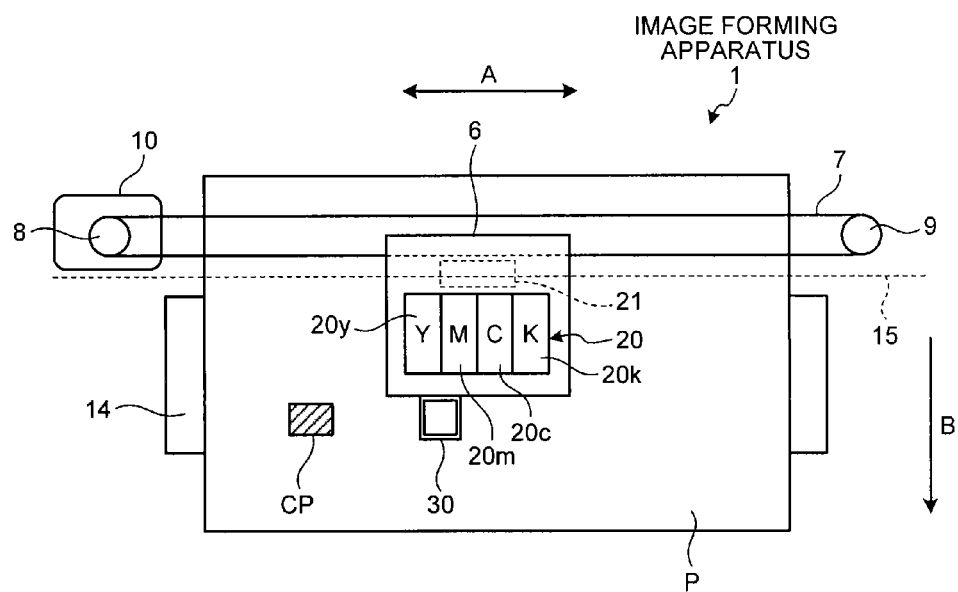
FIG. 2 is a plan view of a carriage section.

As illustrated in FIG. 2, the recording heads 20y, 20m, 20c, and 20k are mounted on the carriage 6. The recording heads 20y, 20m, 20c, and 20k are connected to the cartridges of the respective colors in the cartridge section 11 via the pipes, and eject ink of the respective colors onto a recording medium P opposed to the recording heads. Specifically, the recording head 20y ejects yellow (Y) ink, the recording head 20m ejects magenta (M) ink, the recording head 20c ejects cyan (C) ink, and the recording head 20k ejects black (K) ink.

The recording head 20 is mounted on the carriage 6 such that the ejection surface (nozzle surface) faces downward in FIG. 1 (toward the recording medium P side), and ejects ink onto the recording medium P.

The image forming apparatus 1 includes an encoder sheet 15 parallel to the timing belt 7, that is, parallel to the main guide rod 4, so as to cover at least the moving range of the carriage 6. An encoder sensor 21 that reads the encoder sheet 15 is provided on the carriage 6. The image forming apparatus 1 controls driving of the main-scanning motor 10 based on a reading result that the encoder sensor 21 has obtained from the encoder sheet 15, to thereby control movement of the carriage 6 in the main-scanning direction.

Figure 3:
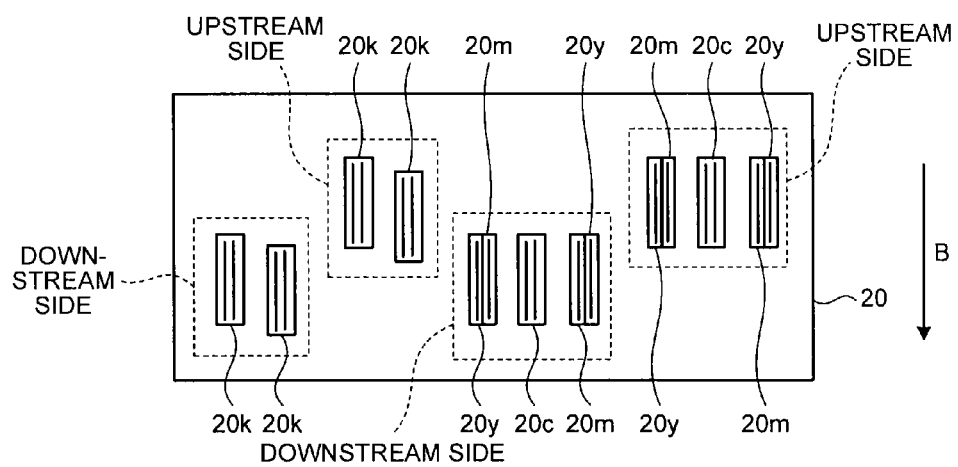
FIG. 3 is a layout diagram of recording heads.

In the recording head 20 mounted on the carriage 6, as illustrated in FIG. 3, the recording heads 20y, 20m, 20c, and 20k are arranged in a plurality of nozzle arrays. By ejecting ink from the nozzle arrays onto the recording medium P conveyed on the platen 14, an image is formed on the recording medium P. To ensure a large width of an image to be formed on the recording medium P by one sweep of scanning of the carriage 6, the image forming apparatus 1 is configured such that the recording head 20 located upstream and the recording head 20 located downstream are mounted on the carriage 6. To improve the print speed for black, the recording heads 20k that eject black ink are mounted on the carriage 6 twice as many as each of the recording heads 20y, 20m, and 20c that eject color ink. Moreover, each of the recording heads 20y and 20m is divided in the main-scanning direction and the divided parts are arranged side by side so as to keep the order of colors superimposed by the reciprocation of the carriage 6 and to prevent a change in the order of colors between the forward movement and the backward movement. The layout of the recording heads 20y, 20m, 20c, and 20k of the recording head 20 is not limited to the layout illustrated in FIG. 3.

As illustrated in FIG. 2, an imaging unit 30 is mounted on the carriage 6. The imaging unit 30 captures a subject (a color measurement object) to measure colors of the subject in a color adjustment process to be described later.

Figure 4:
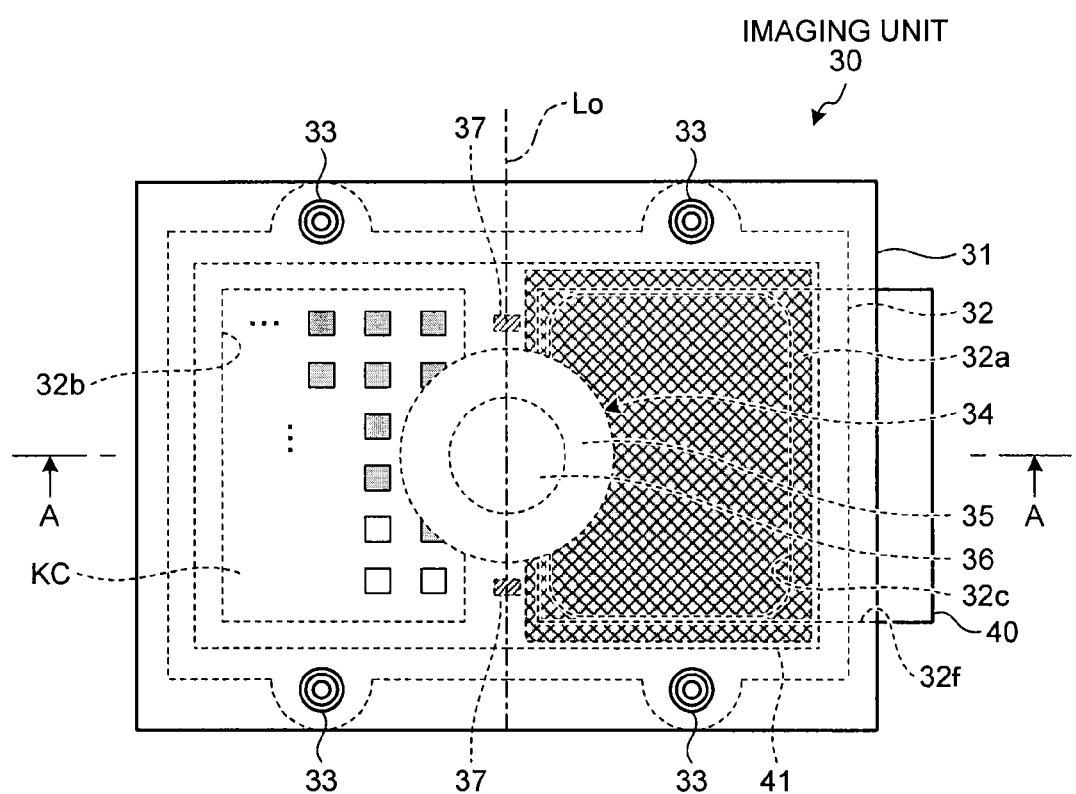
FIG. 4 is a plan view of an imaging unit.
Figure 5:
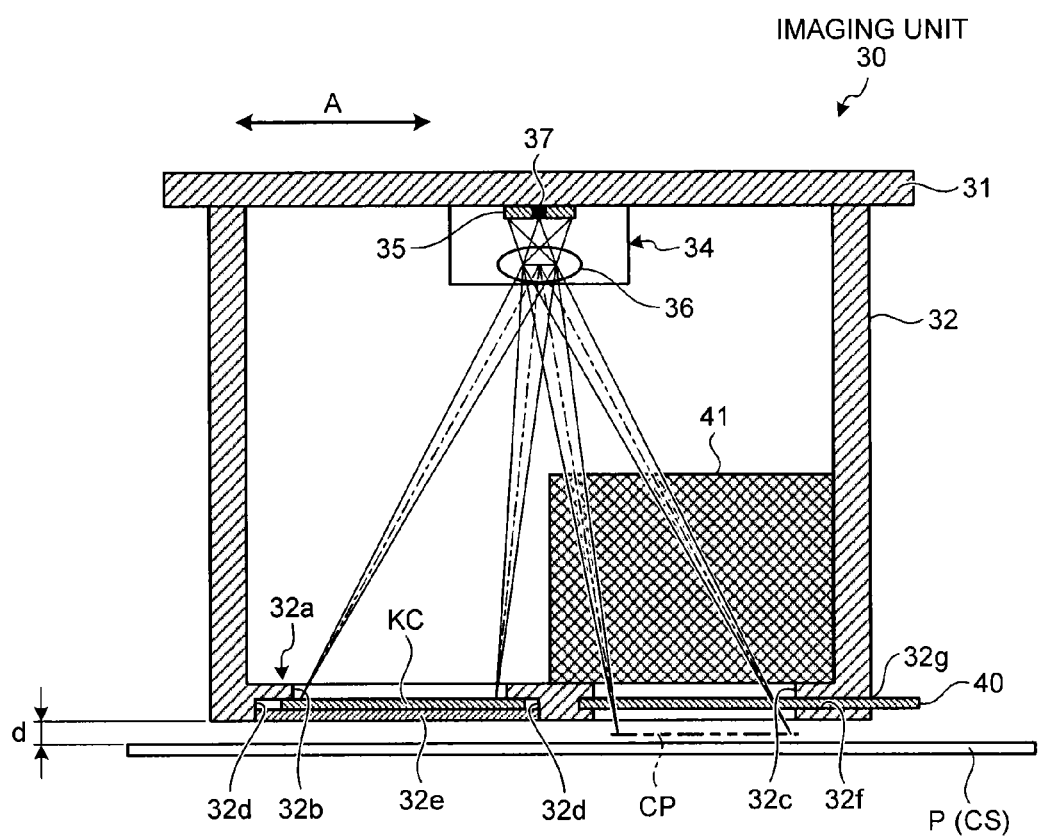
FIG. 5 is a cross-sectional view of the imaging unit viewed in the direction of arrow A-A in FIG. 4.
Figure 6:
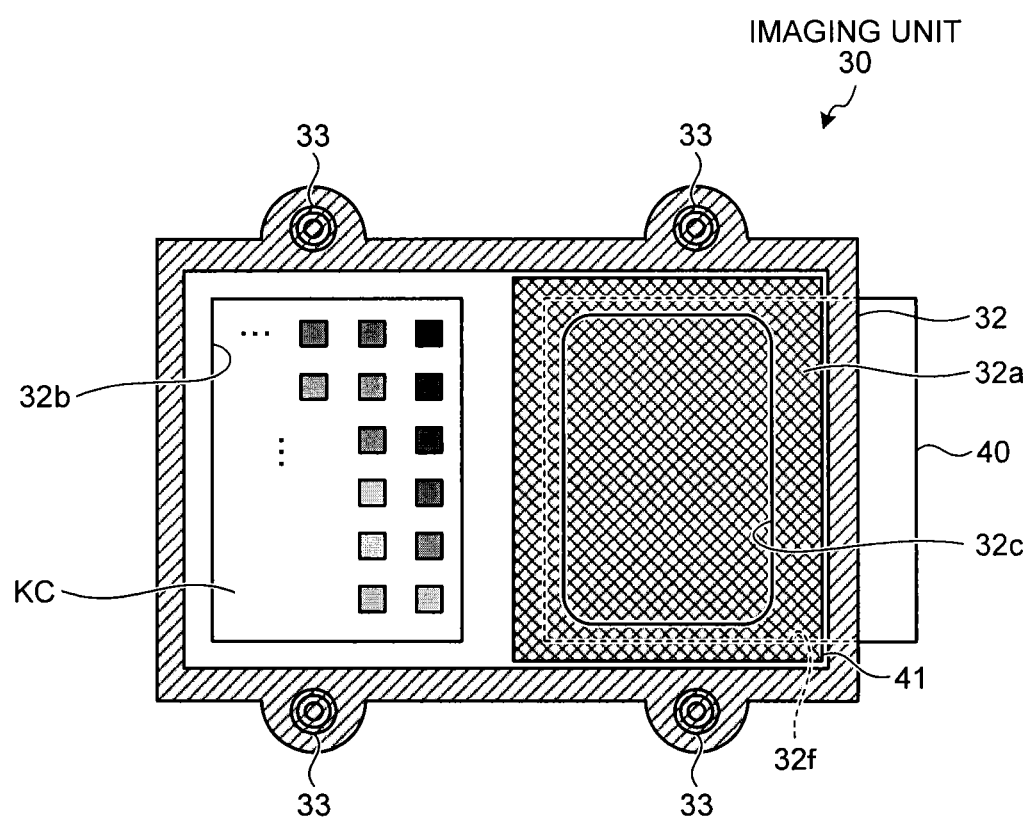
FIG. 6 is a cross-sectional view of the imaging unit viewed in the direction of arrow B-B in FIG. 5.
Figure 7:
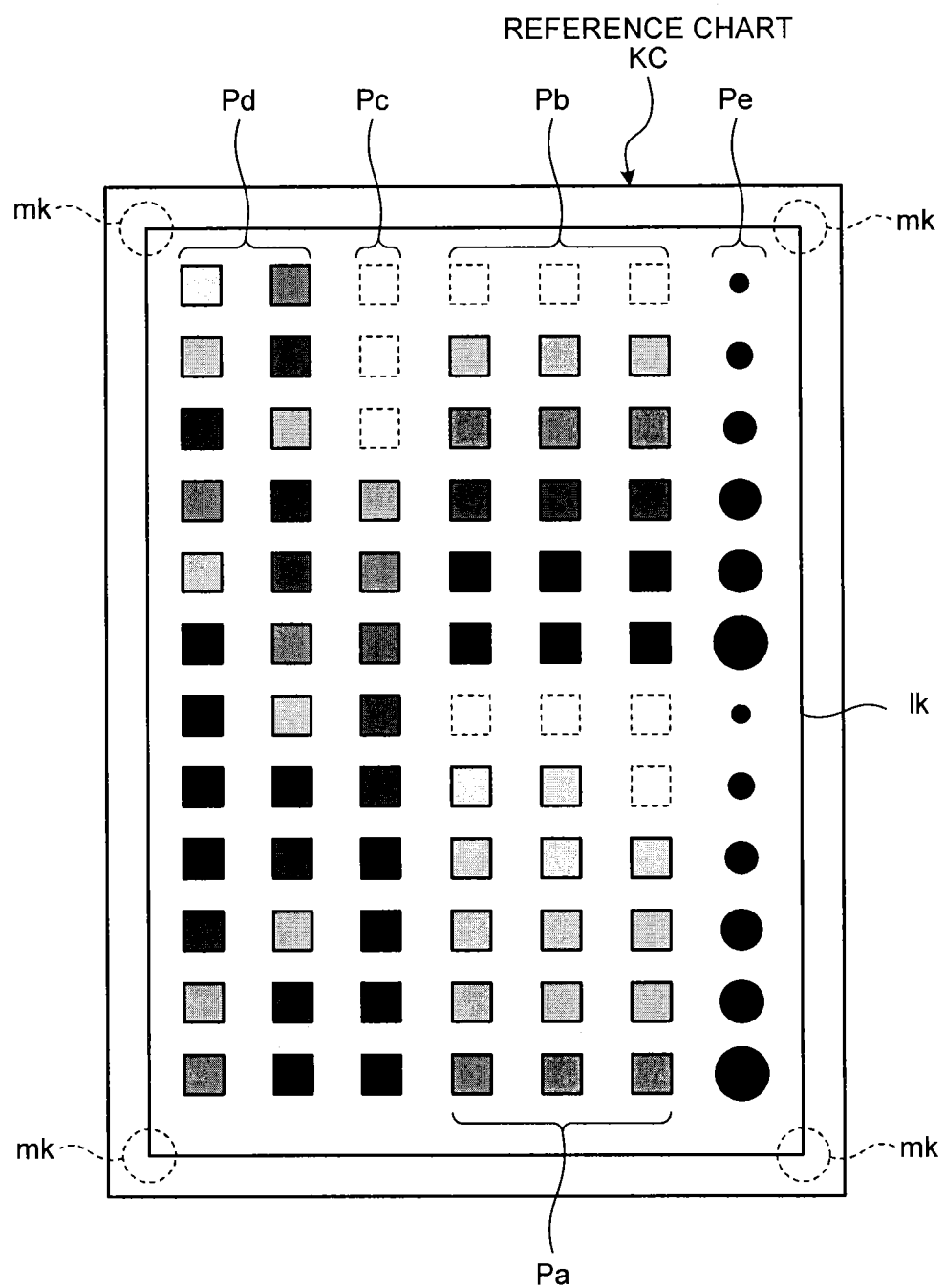
FIG. 7 is a plan view of a reference chart.

The imaging unit 30 includes a substrate 31 as illustrated in FIG. 4 that is a plan view, in FIG. 5 that is a cross-sectional view along line A-A in FIG. 4, and in FIG. 6 that is a cross-sectional view along line B-B in FIG. 5. A frame 32 in the form of a quadrangular box with a surface on the substrate 31 side open is fixed to the substrate 31 by fasteners 33. The substrate 31 is fixed to the carriage 6 illustrated in FIG. 1. The shape of the frame 32 is not limited to the quadrangular box, but may be, for example, a cylindrical box or an elliptical box involving a bottom surface 32a on which openings 32b and 32c are formed.

On the substrate 31 of the imaging unit 30, an image sensor unit (sensor unit) 34 is provided in the center of the surface on the frame 32 side. The image sensor unit 34 includes a two-dimensional image sensor 35, such as a CCD (Charge Coupled Device) sensor or a CMOS (Complementary Metal Oxide Semiconductor) sensor, and a lens 36.

The imaging unit 30 is mounted on the carriage 6 such that a lower side of the surface (hereinafter, described as the bottom surface) 32a of the frame 32 opposite the substrate 31 faces the recording medium P on the platen 14 with a predetermined gap d interposed between the bottom surface and the recording medium P. Approximately rectangular openings 32b and 32c are formed on a bottom surface 3a with the center line Lo interposed therebetween in the main-scanning direction.

It is preferable to make the gap d smaller by taking a focal length to the two-dimensional image sensor 35 into account as will be described later. For example, by taking the relation to the flatness of the recording medium P into account, the gap d is set to about 1 mm to 2 mm so as to prevent the bottom surface of the frame 32 and the recording medium P from contacting each other.

The opening 32c is used to capture reference color patches KP (see FIG. 12) of a reference sheet KS (see FIG. 11) and color-measurement-adjustment color patches CP (see FIG. 15) of a color measurement adjustment sheet CS (see FIG. 15), which are imaging objects (subjects) formed on the recording medium P, as will be described later. It is sufficient that the opening 32c has a size with which at least the whole image of an imaging object can be captured. However, because the gap d is provided between the frame 32 and the imaging object, the opening 32c is set to be slightly greater than the size of the imaging area of an imaging object by taking a shadow that appears around the opening 32c into account.

A recess 32d with a predetermined width is formed on the surface of the opening 32b on the recording medium P side along the periphery of the opening 32b. The reference chart KC (a reference chart unit) is detachably set in a recess 102d. A holder plate 32e that holds the reference chart KC in the recess 32d is detachably attached to the recess 32d of the opening 32b of the frame 32 by fitting, screw fitting, or the like so as to cover the surface of the reference chart KC on the recording medium P side. The opening 32b is closed by the reference chart KC and the holder plate 32e. The surface of the holder plate 32e on the recording medium P side is a smooth flat surface.

The reference chart KC is captured by the imaging unit 30 as an object to be compared with imaged color measurement values of the reference color patches KP of the reference sheet KS and the color-measurement-adjustment color patches CP of the color measurement adjustment sheet CS that is an imaging object in the color adjustment process, together with the reference color patches KP and the color-measurement-adjustment color patches CP. Specifically, the imaging unit 30 captures, as objects to be compared, color patches of the reference chart KC attached to the recess 32d formed around the opening 32b of the bottom surface 32a of the frame 32, together with the reference color patches KP of the reference sheet KS and the color-measurement-adjustment color patches CP of the color measurement adjustment sheet CS provided outside the frame 32, via the opening 32c formed on the bottom surface 32a of the frame 32. Incidentally, because the two-dimensional image sensor 35 reads images by sequentially scanning pixels, the imaging unit 30 does not simultaneously read the reference color patches KP of the reference sheet KS and the color-measurement-adjustment color patches CP of the color measurement adjustment sheet CS in a precise sense. However, the imaging unit 30 can acquire images of the reference color patches KP, the color-measurement-adjustment color patches CP, and the reference chart KC in one frame. Hereinafter, imaging of one frame is appropriately described as "simultaneous imaging" or the like.

Figure 8:
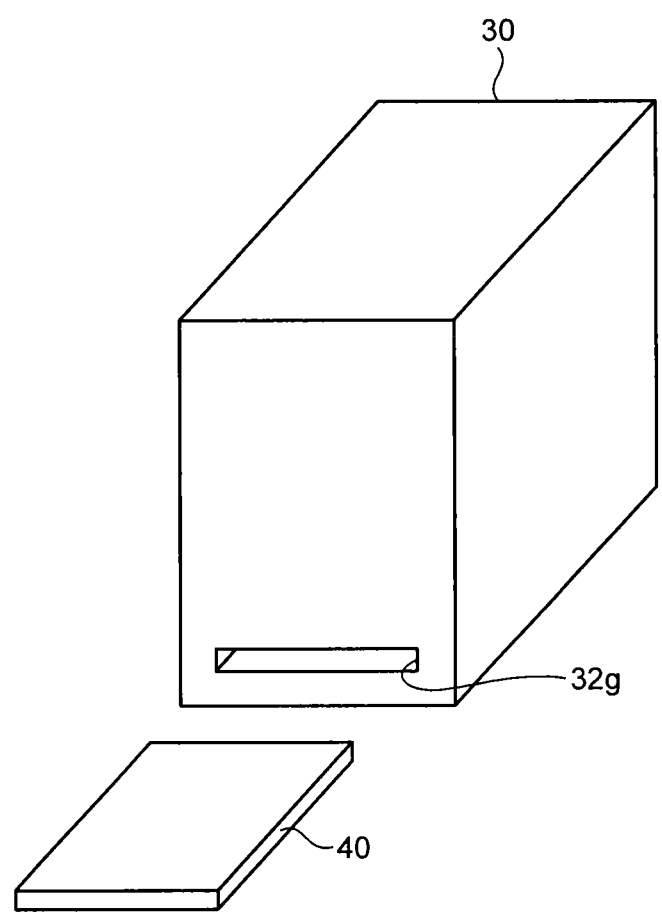
FIG. 8 is a perspective view of the imaging unit.

As illustrated in FIG. 8, similarly to the reference sheet KS to be described later, the reference chart KC contains a plurality of color-measurement reference color patch arrays Pa to Pd, a dot diameter measurement pattern array Pe, a distance measurement line lk, and a chart position specification marker mk, all of which are arranged on a surface (top surface) inside the frame 32.

The color-measurement reference color patch arrays Pa to Pd include a patch array Pa in which color patches of primary colors of YMC are arranged in order of scale, a patch array Pb in which color patches for secondary colors of RGB are arranged in order of scale, a patch array (monochrome tone pattern) Pc in which gray scale patches are arranged in order of scale, and a patch array Pd in which patches for tertiary colors are arranged. The dot diameter measurement pattern array Pe is a pattern array for measuring geometric configurations, in which circular patterns with different sizes are arranged in order of size.

The distance measurement line lk is formed as a rectangular frame line surrounding the color-measurement reference color patch arrays Pa to Pd and the dot diameter measurement pattern array Pe. The chart position specification markers mk are arranged at four corners of the distance measurement line lk to specify the position of each of the patches.

A color measurement control unit 106 (see FIG. 10 and FIG. 11), which will be described later, specifies the distance measurement line lk and the chart position specification markers mk at the four corners in the image data of the reference chart KC obtained from the imaging unit 30, to thereby specify the positions of the reference chart KC and each of the patterns.

For each of the patches of the color-measurement reference color patch arrays Pa to Pd, similarly to the reference color patches KP of the reference chart KC to be described later, color values (Lab values) in the Lab color space that is a standard color space are measured in advance by using a spectrometer BS, and are used as reference values when colors of the color-measurement-adjustment color patches CP of the color measurement adjustment sheet CS are measured.

The configuration of the color-measurement reference color patch arrays Pa to Pd arranged in the reference chart KC are not limited to the arrangement example illustrated in FIG. 8, and an arbitrary patch array may be used. For example, it may be possible to use a patch array that can specify a color range as wide as possible. For another example, the patch array Pa for the primary colors of YMCK or the patch array PC for the gray scale may be formed with patches having color measurement values of the ink used by the image forming apparatus 1. For still another example, the patch array Pb for the secondary colors of RGB of the reference chart KC may be formed with patches having color measurement values that can be produced by the ink used by the image forming apparatus 1. For still another example, it may be possible to use a standard color chart for which color measurement values are defined based on Japan Color or the like.

In the embodiment, the reference chart KC containing the reference color patch arrays Pa to Pd in the form of a general patch (color patch) is used. However, the reference chart KC does not necessarily have to contain the reference color patch arrays Pa to Pd as described above. It is sufficient that the reference chart KC contains a plurality of colors that can be used for color measurement and the colors are arranged such that their positions can be specified.

The reference chart KC is arranged in the recess 32d formed on the outer periphery of the surface of the opening 32b on the recording medium P side on the bottom surface 32a of the frame 32. Therefore, the two-dimensional image sensor 35 of the image sensor unit 34 can capture the reference chart KC at the same focal length as that of the imaging object, such as the recording medium P. Furthermore, the reference chart KC is detachably set in the recess 32d formed on the outer periphery of the surface of the opening 32b on the recording medium P side on the bottom surface 32a of the frame 32, and the surface on the recording medium P side is detachably held by the holder plate 32e that is detachably attached to the recess 32d. Therefore, even when a foreign matter that has entered the frame 32 adheres to the surface of the reference chart KC, it is possible to detach the holder plate 32e and the reference chart KC, clean the reference chart KC, and then attach the holder plate 32e and the reference chart KC again. Therefore, the measurement accuracy of the reference chart KC can be improved.

Referring back to FIG. 4 to FIG. 6, the imaging unit 30 includes a pair of illumination light sources 37 that are arranged on the substrate 31 so as to be on the center line Lo passing the center of the image sensor unit 34 in the sub-scanning direction and be equally separated by a predetermined amount from the center of the image sensor unit 34 in the sub-scanning direction. As the illumination light sources 37, LEDs (Light Emitting Diodes) or the like are used. The illumination light sources 37 are disposed on the center line Lo that is right above the bottom surface 32a between the reference chart KC and the opening 32c. The bottom surface 32a may be subjected to a surface treatment, such as a treatment for coloring the surface in black or a treatment for forming small irregularities on the surface, to prevent specular reflection. The illumination light sources 37 are not limited to the LED. For example, an organic EL may be used as the illumination light sources 37. If the organic EL is used as the illumination light sources 37, illumination light with a spectral distribution similar to that of sunlight can be obtained, so that the color measurement accuracy can be improved.

In the imaging unit 30, the opening 32c and the reference chart KC in the imaging area are arranged so as to be approximately symmetric with respect to the center line Lo connecting the center of the lens 36 and the illumination light sources 37. Therefore, it is possible to set the same imaging condition of the two-dimensional image sensor 35 in a line symmetric manner. As a result, it is possible to improve the accuracy of the color adjustment process or the color measurement process performed by the two-dimensional image sensor 35 using the reference chart KC.

A mist preventing plate (cover member) 40 that can open and close the opening 32c is mounted on the imaging unit 30. As illustrated in FIG. 4, FIG. 6, and FIG. 8, a guide groove 32f is formed at the intermediate position in the thickness direction of the bottom surface 32a of the frame 32 so as to surround the opening 32c. As illustrated in FIG. 8, the mist preventing plate 40 is detachably mounted in the guide groove 32f via an insertion opening 32g that is formed on a side surface of the frame 32 on the opposite side of the reference chart KC side.

When the image forming apparatus 1 forms a normal image, the mist preventing plate 40 is manually inserted by a user into the guide groove 32f of the imaging unit 30 via the insertion opening 32g, and is mounted so as to cover the whole surface of the opening 32c. The mist preventing plate 40 is made of, for example, acrylic resin (PMMA (Poly methyl methacrylate) with t=1, where t is a nominal thickness (millimeters) of glass).

The image forming apparatus 1 forms a normal image or a subject, such as the reference color patches KP or the color-measurement-adjustment color patches CP, on the recording medium P by ejecting ink drops toward the recording medium P via nozzle holes formed on the nozzle surfaces of the recording heads 20y, 20m, 20c, and 20k on the carriage 6. In this case, the image forming apparatus 1 continuously ejects a plurality of ink drops from the nozzle holes, and the continuously-ejected ink drops are coalesced into a single ink drop while scattering. However, ink drops accompanying the coalesced ink drop are not coalesced but form small ink drops called satellite. The small ink drops called satellite start traveling out of the scattering trajectory of the coalesced drop that is to be attached as an image onto the recording medium P, resulting in mist.

If the mist enters the inside of an outer surface of the bottom surface 32a of the frame 32 of the imaging unit 30 opposing the recording medium P, in particular, the inside of the outer surface of the opening 32c, components located inside of the outer surface of the frame 32 (hereinafter, components are appropriately described as inner components) get dirty, so that the imaging accuracy is reduced, reducing the color measurement accuracy to be described later. Therefore, in the imaging unit 30 of the embodiment, when the image forming apparatus 1 forms a normal image, the opening 32c is covered by the mist preventing plate 40 in order to effectively prevent the mist from entering the inside of the opening 32c and to prevent a reduction in the color measurement accuracy due to dirt on the inner component.

The mist preventing plate 40 is manually pulled out and dismounted from the guide groove 32f by a user at a color measurement timing of the image forming apparatus 1. Therefore, the imaging unit 30 is enabled to capture a subject located outside the frame 32 by using the image sensor unit 34.

In the frame 32 of the imaging unit 30, an optical path length changing member 41 is provided on the optical path between the recording medium P and the two-dimensional image sensor 35 via the opening 32c so as to close the opening 32c. As the optical path length changing member 41, a transmissive member with a refractive index n (n is an arbitrary value) is used. The optical path length changing member 41 has, as illustrated in FIG. 5 and FIG. 6, a quadrangular shape greater than that of the opening 32c, and is disposed inside the frame 32. The fixed position of the optical path length changing member 41 is not limited to the position of the opening 32c inside the frame 32 as long as the optical path length changing member 41 is located on the optical path between the opening 32c and the two-dimensional image sensor 35. For example, the optical path length changing member 41 may be disposed at the position on the imaging surface side of the frame 32 or the position separated from the opening 32c inside the frame 32. When light passes through the optical path length changing member 41 with the refractive index n, the optical path length of the light extends according to the refractive index n of the optical path length changing member 41, so that the light is incident on the two-dimensional image sensor 35 such that an image is seen as if it floats. The floating amount C of the image is obtained by Equation (1) below:

$$C=Lp(1-1/n) \quad (1)$$

where Lp is the length of the optical path length changing member 41.

A focal length L to the focal plane of the imaging unit 30 other than the reference chart KC, that is, the focal length L to the surface of the recording medium P to be captured via the optical path length changing member 41 and the opening 32c is obtained by Equation (2) below:

$$L=Lc+Lp(1-1/n) \quad (2)$$

where Lc is a distance between a top of the lens 36 on the imaging object side and the reference chart KC, and n is the refractive index of the optical path length changing member 41.

Therefore, if, for example, the refractive index n of the optical path length changing member 41 is set to 1.5, L=Lc+Lp(1−1/1.5)=Lc+Lp(⅓), so that the optical path length can be extended by about one-third of the length Lp of the optical path length changing member 41. If Lp=9 (mm), L=Lc+3 (mm), so that the focal position of the reference chart KC matches the focal position on the imaging surface of the recording medium P. Therefore, a conjugate relation can be established between the reference chart KC and the imaging surface of the recording medium P.

In this way, by providing the optical path length changing member 41, the imaging unit 30 can capture the reference chart KC and a subject located outside the frame 32 at the same focal length, so that it becomes possible to capture the reference chart KC and the subject with higher accuracy.

Furthermore, because the mist preventing plate 40 is provided on the frame 32, the imaging unit 30 can close the opening 32c by the outer surface of the frame 32 to prevent a paper piece or mist, in particular, mist, from entering the inner side of the frame 32 (hereinafter, appropriately described as the inside of the frame 32) with respect to the outer surface of the opening 32c due to an image forming operation of the image forming apparatus 1. Therefore, it is possible to prevent the inner components such as the surface of the optical path length changing member 41 on the opening 32c side, the reference chart KC, and the image sensor unit 34 inside the frame 32 from getting dirty with the mist that has entered the inside of the frame 32. Consequently, it is possible to capture the reference chart KC and a subject with high accuracy and efficiently prevent a reduction in the color measurement accuracy due to dirt on the inner components.

Figure 9:
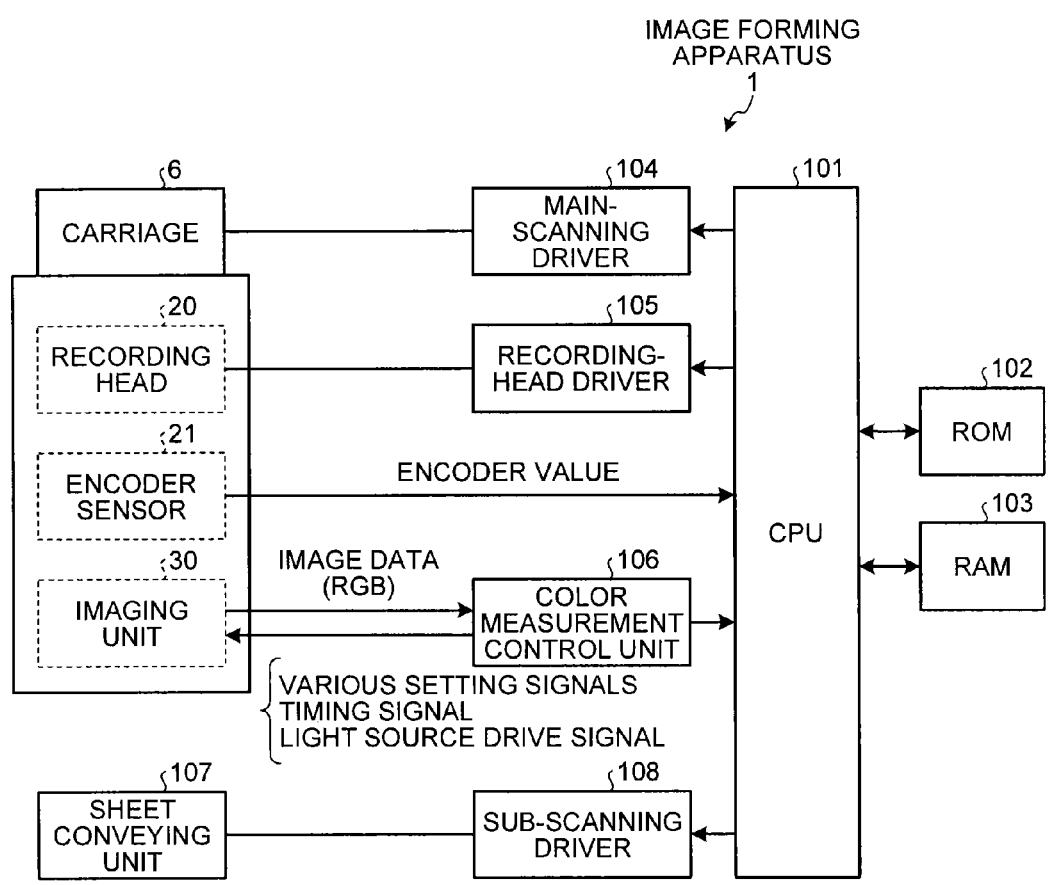
FIG. 9 is a block diagram illustrating configurations of main parts of the image forming apparatus.

The image forming apparatus 1 according to the embodiment is configured as illustrated in a block diagram in FIG. 9. Specifically, the image forming apparatus 1 includes a CPU (Central Processing Unit) 101, a ROM (Read Only Memory) 102, a RAM (Random Access Memory) 103, a main-scanning driver 104, a recording-head driver 105, the color measurement control unit 106, a sheet conveying unit 107, and a sub-scanning driver 108. The image forming apparatus 1 also includes the recording head 20, the encoder sensor 21, and the imaging unit 30, all of which are mounted on the carriage 6 as described above.

The ROM 102 stores therein programs, such as a basic program of the image forming apparatus 1 and the color adjustment processing program, and necessary system data. The CPU 101 performs a basic process as the image forming apparatus 1 by controlling each of the units of the image forming apparatus 1 based on the programs stored in the ROM 102 by using the RAM 103 as a working memory. The CPU 101 also performs a color adjustment process based on a color measurement value obtained through the color measurement process performed by the color measurement control unit 106, at the time of image formation.

Regarding the control of the carriage 6 and the sheet conveying unit 107, the CPU 101 controls the movement of the carriage 6 in the main-scanning direction by controlling driving of the main-scanning driver 104 based on an encoder value obtained by the encoder sensor 21. The CPU 101 also controls driving of the sheet conveying unit 107, such as a sub-scanning motor or a conveying roller (not illustrated), via the sub-scanning driver 108. The CPU 101 also controls an ink ejection timing and an ink ejection amount of the recording head 20 via the recording-head driver 105. The CPU 101 also controls lighting of the illumination light sources 37 of the imaging unit 30 via the color measurement control unit 106.

As described above, to generate a color measurement value for color adjustment to accurately reproduce colors desired by a user in image data of an image to be output or recorded, the imaging unit 30 captures the color-measurement-adjustment color patches CP formed on the recording medium P by the recording head 20 and outputs the captured RGB value to the color measurement control unit 106 at the time of color measurement, which will be described later. In the embodiment, the color measurement control unit 106 and the imaging unit 30 are separated from each other. However, the color measurement control unit 106 and the imaging unit 30 may be integrated with each other. For example, it may be possible to mount a control circuit that functions as the color measurement control unit 106 on the substrate 31 of the imaging unit 30.

Figure 10:
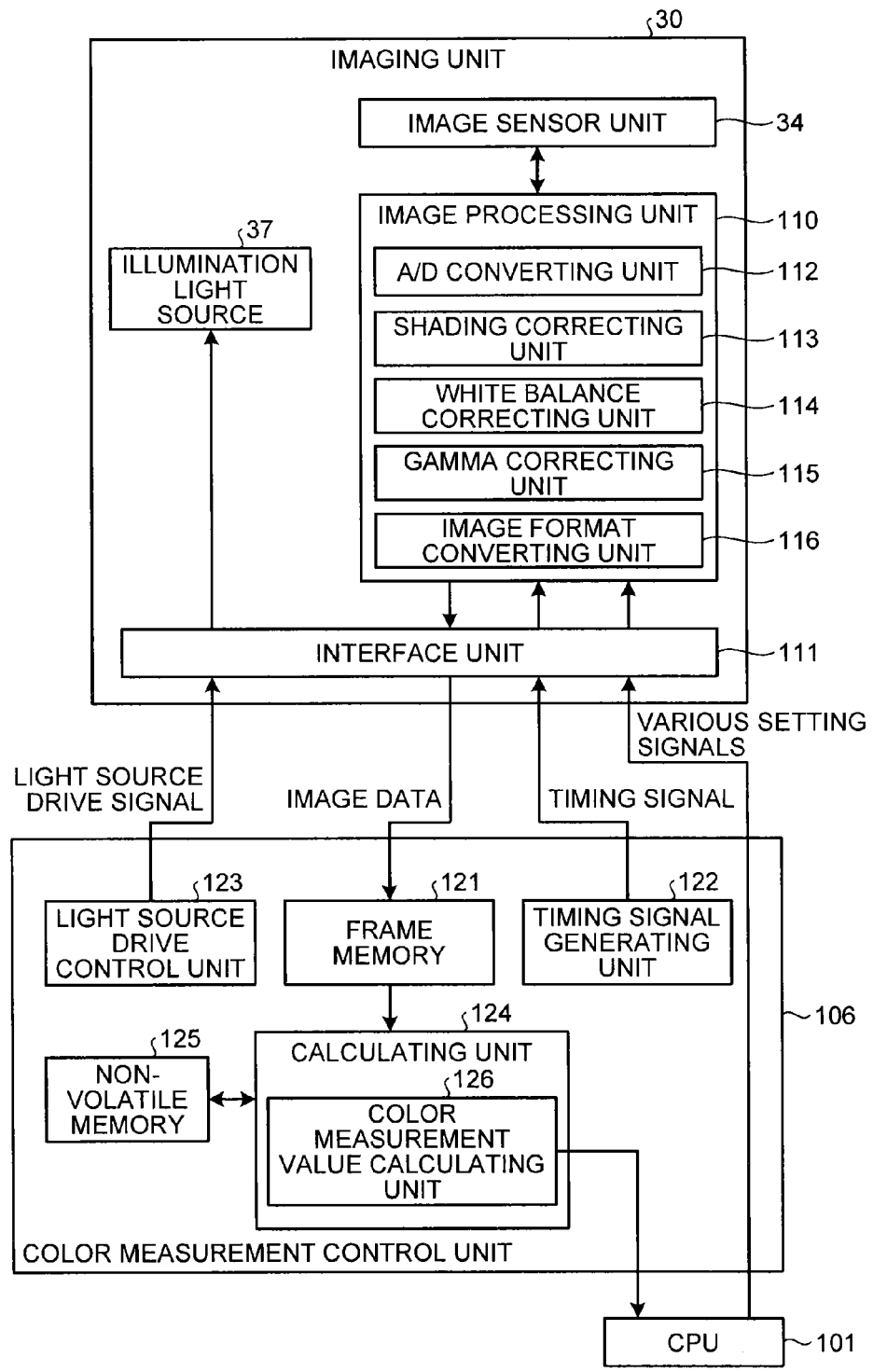
FIG. 10 is a block diagram illustrating configurations of the imaging unit and a color measurement control unit.

The imaging unit 30 and the color measurement control unit 106 are configured as illustrated in a block diagram in FIG. 10. The imaging unit 30 includes the illumination light sources 37 and the image sensor unit 34 as described above, and also includes an image processing unit 110 and an interface unit 111. The image processing unit 110 includes an A/D converting unit 112, a shading correcting unit 113, a white balance correcting unit 114, a gamma correcting unit 115, and an image format converting unit 116. In the embodiment, the image processing unit 110 and the image sensor unit 34 are separated from each other. However, it may be possible to provide the functions of the image processing unit 110 to the two-dimensional image sensor 35 of the image sensor unit 34.

The imaging unit 30 outputs analog RGB image data that the image sensor unit 34 has obtained by simultaneously capturing a subject and the reference chart KC to the image processing unit 110. The image processing unit 110 performs necessary image processing on the analog RGB image data sent by the image sensor unit 34, and outputs the processed image data to the color measurement control unit 106.

The A/D converting unit 112 of the image processing unit 110 converts the analog RGB image data input by the image sensor unit 34 into digital RGB image data, and outputs the digital image data to the shading correcting unit 113.

The shading correcting unit 113 corrects an error in the image data, i.e., in the RGB image data input by the A/D converting unit 112, due to non-uniform illuminance of the illumination light that the illumination light sources 37 have applied to the imaging range of the image sensor unit 34, and outputs the corrected image data to the white balance correcting unit 114.

The white balance correcting unit 114 corrects the white balance of the RGB image data that has been subjected to the shading correction, and outputs the corrected image data to the gamma correcting unit 115.

The gamma correcting unit 115 corrects the image data input by the white balance correcting unit 114 so as to compensate for the linearity of the sensitivity of the image sensor unit 34, and outputs the corrected image data to the image format converting unit 116.

The image format converting unit 116 converts the image data subjected to the gamma correction into an arbitrary format, and outputs the image data in the converted format to the color measurement control unit 106 via the interface unit 111.

The interface unit 111 is an interface that allows the imaging unit 30 to acquire various setting signals, a timing signal, and a light source drive signal sent by the color measurement control unit 106, and allows the imaging unit 30 to send image data to the color measurement control unit 106.

The color measurement control unit 106 includes a frame memory 121, a timing signal generating unit 122, a light source drive control unit 123, a calculating unit 124, and a nonvolatile memory 125. The calculating unit 124 includes a color measurement value calculating unit 126.

The frame memory 121 is a memory for temporarily storing image data sent by the imaging unit 30 and for outputting the stored image data to the calculating unit 124.

Figure 11:
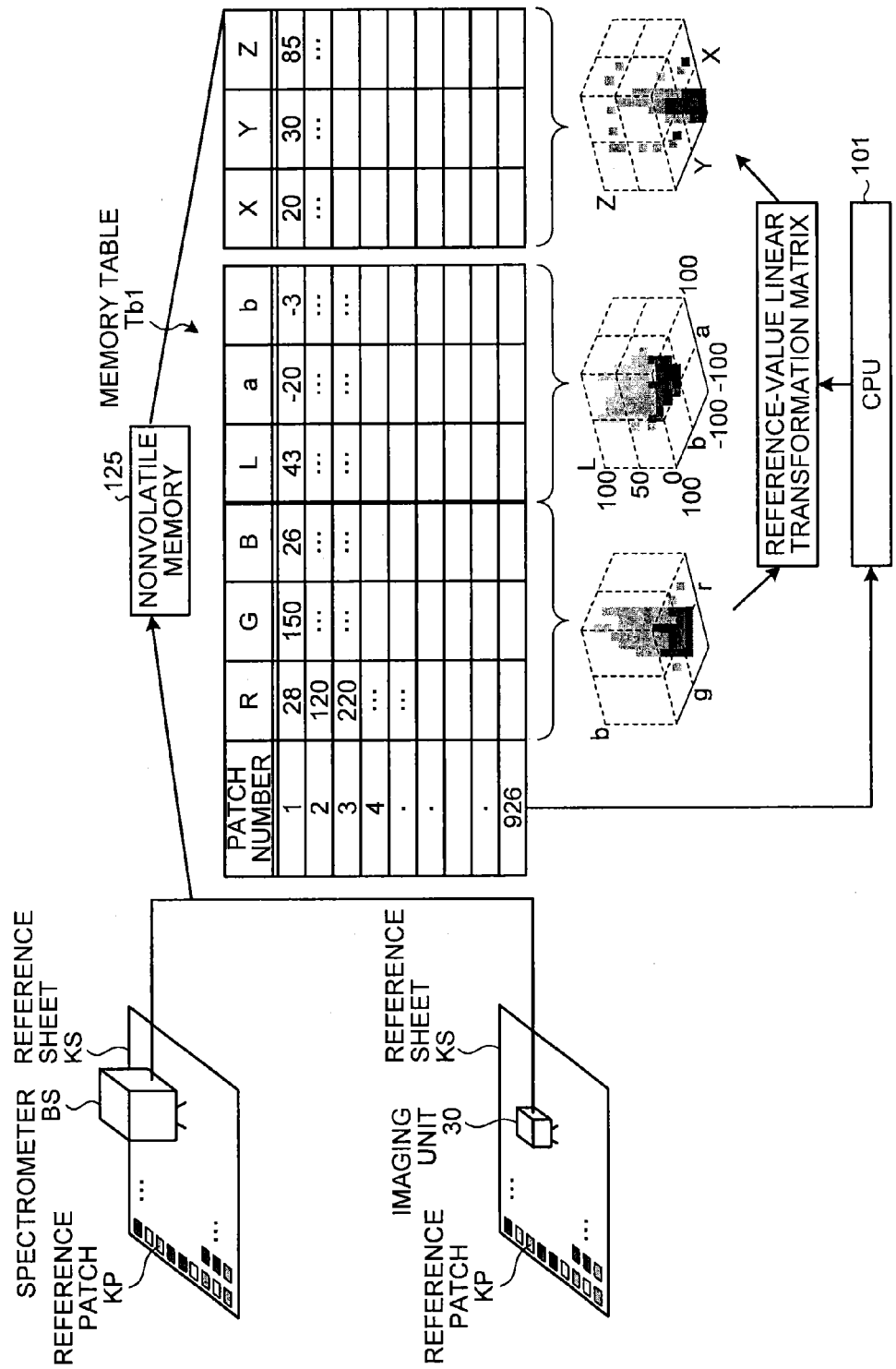
FIG. 11 is a diagram for explaining a process for acquiring a reference color measurement value and an imaged reference RGB value from a reference sheet and a process for acquiring a reference-value linear transformation matrix.

As illustrated in FIG. 11, the nonvolatile memory 125 stores therein, as reference color measurement values, at least one of the Lab value and the XYZ value (in FIG. 11, both of the Lab value and the XYZ value), which are color measurement values of a color measurement result that the spectrometer BS has read from a plurality of the reference color patches KP arrayed on the reference sheet KS. The reference color measurement values are stored in the memory table Tb1 in the nonvolatile memory 125 in association with patch numbers.

When the reference color measurement values are stored in the memory table Tb1 in the nonvolatile memory 125 and the image forming apparatus 1 is in the initial state, the image forming apparatus 1 sets the reference sheet KS on the platen 14, controls the movement of the carriage 6, and stores imaged reference RGB values that the imaging unit 30 has obtained by reading the same reference color patches KP of the reference sheet KS as those read by the spectrometer BS in the memory table Tb1 in the nonvolatile memory 125 in association with the patch numbers, i.e., in association with the reference color measurement values. Furthermore, the image forming apparatus 1 acquires RGB values by capturing the patches of the reference chart KC of the imaging unit 30 and stores, as initial reference RGB values RdGdBd, the RGB values of the respective patches of the reference chart KC in the memory table T1 in the nonvolatile memory 125 under the control of the calculating unit 124.

In the image forming apparatus 1, after the reference color measurement values, the imaged reference RGB values, and the initial reference RGB values RdGdBd are stored in the nonvolatile memory 125, the color measurement value calculating unit 126 calculates a reference-value linear transformation matrix for converting between the XYZ value being the reference color measurement value and the imaged reference RGB value, which are stored as a pair in the nonvolatile memory 125, i.e., a pair of the XYZ value and the imaged reference RGB value associated with the same patch number, and stores the calculated reference-value linear transformation matrix in the nonvolatile memory 125.

In the image forming apparatus 1, the above processes are performed when the image forming apparatus 1 is in the initial state, so that the reference color measurement values, the imaged reference RGB values, and the initial reference RGB values RdGdBd, which are execution results, are registered in the memory table Tb1 in the nonvolatile memory 125 and then the reference-value linear transformation matrix is calculated and stored in the nonvolatile memory 125.

As will be described later, when performing the color adjustment process, the image forming apparatus 1 according to the embodiment causes the image sensor unit 34 to simultaneously capture the color-measurement-adjustment color patches CP, which are formed on the recording medium P by the recording head 20 that may have changed over time, and the reference chart KC arranged inside the frame 32, and outputs the image data including the color-measurement-adjustment color patches CP and the reference chart KC to the color measurement control unit 106. The color measurement control unit 106 converts the RGB values of the color-measurement-adjustment color patches CP acquired from the imaging unit 30 based on the initial reference RGB values RdGdBd of the patches Pa to Pe of the reference chart KC that has simultaneously been read and stored by the imaging unit 30 when the imaging unit 30 has read the reference color patches (hereinafter, described as initial reference color patches) of the reference sheet KS, and based on the RGB values (hereinafter, described as color-measured reference RGB values) of the patches Pa to Pe of the reference chart KC that has simultaneously been captured when the color adjustment patches CP has been captured at the time of the color adjustment process. Subsequently, the color measurement control unit 106 performs the color measurement process to obtain color measurement values of the color-measurement-adjustment color patches CP.

Specifically, the calculating unit 124 controls the operation of the color measurement control unit 106, and the color measurement value calculating unit 126 performs the color measurement process and outputs color measurement values as a processing result of the color measurement process to the CPU 101. The CPU 101 performs the color adjustment process on the image data by using the color measurement values, and controls the recording head 20 based on the image data that has been subjected to the color adjustment process so as to form an image with the improved color reproducibility.

The image forming apparatus 1 according to the embodiment includes a color measuring device that reads a color measuring program for implementing a color measuring method of the embodiment from a computer-readable recording medium, such as a ROM, an EEPROM (Electrically Erasable and Programmable Read Only Memory), an EPROM, a flash memory, a flexible disk, a CD-ROM (Compact Disc Read Only Memory), a CD-RW (Compact Disc Rewritable), a DVD (Digital Versatile Disk), an SD (Secure Digital) card, or an MO (Magneto-Optical Disc), and loads the color measuring program onto the ROM 102 or the nonvolatile memory 125, thereby implementing the color measuring method to realize stable color reproducibility at low costs as will be described later. The color measuring program is a computer-executable program written in a legacy programming language, such as an assembly language, C, C++, C#, or Java (registered trademark), or an object-oriented programming language, and can be distributed by being stored in the recording medium as described above.

Operations according to the embodiment will be explained below. The image forming apparatus 1 according to the embodiment implements the color measuring method to realize stable color reproducibility at low costs.

As illustrated in FIG. 11, the image forming apparatus 1 according to the embodiment stores, as the reference color measurement values, at least one of the Lab value and the XYZ value, which are color measurement values as a color measurement result that the spectrometer BS has obtained by reading a plurality of the reference color patches arrayed on the reference sheet KS, in the memory table Tb1 in the nonvolatile memory 125 in association with the patch numbers.

Figure 12:
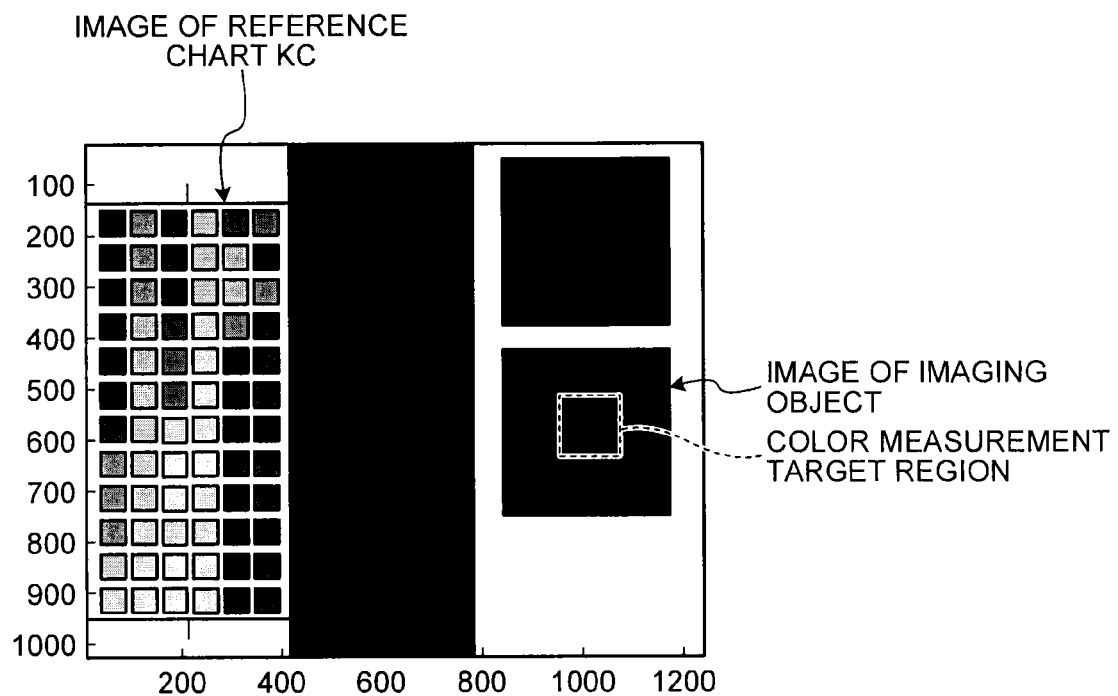
FIG. 12 is a diagram illustrating an example of image data obtained by simultaneously capturing the reference chart and an imaging object.

When the reference color measurement values are stored in the memory table Tb1 in the nonvolatile memory 125 and the image forming apparatus 1 is in the initial state because of manufacturing or overhaul, the image forming apparatus 1 sets the reference sheet KS on the platen 14 of the image forming apparatus 1, controls the movement of the carriage 6, causes the imaging unit 30 to capture the same reference color patches KP of the reference sheet KS as those read by the spectrometer BS, and causes the imaging unit 30 to simultaneously capture the patches (the initial reference color patches) of the reference chart KC arranged inside the frame 32 as illustrated in FIG. 12. At this time, the reference color patches of the reference sheet KS are captured by the image sensor unit 34 of the imaging unit 30 via the opening 32c from which the mist preventing plate 40 is detached.

After the imaging unit 30 captures the reference color patches of the reference sheet KS and the patches of the reference chart KC, the calculating unit 124 of the color measurement control unit 106 stores the imaged reference RGB values, which are RGB values obtained by processing the image data of the captured reference color patches of the reference sheet KS by the image processing unit 110, i.e., device-dependent signals dependent on the device, in the memory table Tb1 in the nonvolatile memory 125 in association with the patch numbers, i.e., in association with the reference color measurement values, as illustrated in FIG. 11. Furthermore, the calculating unit 124 of the color measurement control unit 106 stores the initial reference RGB values RdGdBd, which are RGB values obtained by reading and processing the initial reference color patches of the reference chart KC by the image processing unit 110, in the nonvolatile memory 125 as illustrated in FIG. 13A.

Figures 13A, 13B:
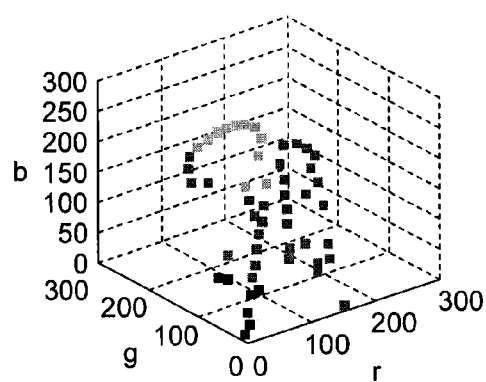
FIGS. 13A and 13B are diagrams illustrating an example of an initial reference RGB value.

The calculating unit 124 calculates an average for each predetermined region, for example, a region indicated by a dashed line in FIGS. 13A and 13B (a color measurement target region) of the image data of the initial reference color patches of the reference chart KC read by the imaging unit 30, and regards the averages as the initial reference RGB values RdGdBd. If the initial reference RGB values RdGdBd are calculated by averaging a number of pixels in the measurement target region as described above, it becomes possible to reduce the influence of noise and improve the bit resolution. FIG. 13B is a scatter diagram of the initial reference RGB values RdGdBd. FIG. 13A illustrates a state in which reference Lab values Ldadbd, which are Lab values converted from the initial reference RGB values RdGdBd, and reference XYZ values xdydzd, which are XYZ values converted from the initial reference RGB values RdGdBd, are registered in the nonvolatile memory 125.

After the reference color measurement values, the imaged reference RGB values, and the initial reference RGB values RdGdBd are stored in the nonvolatile memory 125, the color measurement value calculating unit 126 of the calculating unit 124 calculates the reference-value linear transformation matrix for converting between the XYZ value of the reference color measurement value and the imaged reference RGB value, which are stored as a pair in the nonvolatile memory 125, i.e., a pair of the XYZ value and the imaged reference RGB value associated with the same patch number, and stores the calculated reference-value linear transformation matrix in the nonvolatile memory 125.

In this state, the CPU 101 controls the movement of the carriage 6 in the main-scanning direction, controls conveyance of the recording medium P by a sheet conveying unit 48, and controls driving of the recording head 20 based on the image data or a print setting input from an external apparatus, to thereby intermittently convey the recording medium P and cause the recording heads 20y, 20m, 20c, and 20k of the recording head 20 to eject ink to output or record an image on the recording medium P. When the image forming operations are performed in the imaging unit 30, the opening 32c of the frame 32 is closed by the mist preventing plate 40 that is inserted from the insertion opening 32g along the guide groove 32f.

Therefore, it is possible to prevent mist, such as paper powder, from entering the inside of the frame 32 of the imaging unit 30. Consequently, is becomes possible to prevent the components inside the frame 32, in particular, the optical path length changing member 41, the reference chart KC, and the image sensor unit 34, from getting dirty with the mist.

In this case, the ink ejection amount of the recording head 20y, 20m, 20c, or 20k may change due to device-specific characteristics or may change over time. If the ink ejection amount changes, an image may be formed in colors different from colors desired by a user, resulting in reduced color reproducibility.

Therefore, the image forming apparatus 1 calculates a color measurement value and performs a color adjustment process to adjust colors based on the color measurement value at a predetermined color adjustment process timing.

Figure 14:
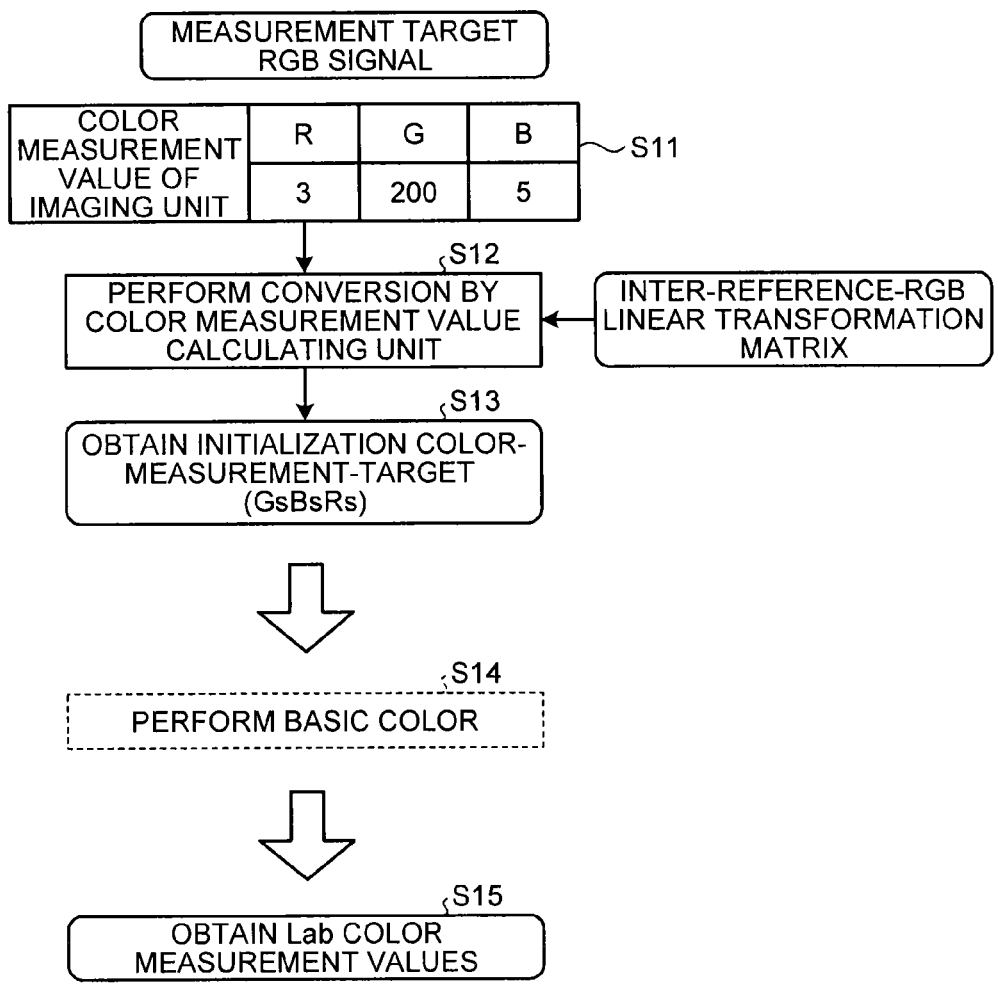
FIG. 14 is a diagram for explaining a color measurement process.

Specifically, at the color adjustment process timing, the image forming apparatus 1 forms a plurality of the color patches (the color-measurement-adjustment color patches) CP on the recording medium P by the recording head 20 as illustrated in FIG. 14, and records or outputs the color-measurement-adjustment color patches CP as the color measurement adjustment sheet CS. When the color measurement adjustment sheet CS is recorded or output, the opening 32c of the frame 32 of the imaging unit 30 is closed by the mist preventing plate 40.

The color measurement adjustment sheet CS is formed of the color-measurement-adjustment color patches CP that are a plurality of color patches for color measurement adjustment and that are formed by the recording head 20. The color-measurement-adjustment color patches CP reflect the output characteristics of the image forming apparatus 1, in particular, the output characteristics of the recording head 20, at the color adjustment process timing. The color patch data of the color-measurement-adjustment color patches CP is stored in advance in the nonvolatile memory 125 or the like.

As will be described later, the image forming apparatus 1 regards the RGB values obtained by capturing a plurality of the color-measurement-adjustment color patches CP of the color measurement adjustment sheet CS as color-measurement-target RGB values (color-measurement RGB values), and converts the color-measurement-target RGB values into the initial reference RGB values RdGdBd. Subsequently, the image forming apparatus 1 selects reference color measurement values (neighboring reference color measurement values) at close distances from the color measurement values converted from the initial reference RGB values RdGdBd from among the reference color measurement values registered in the memory table Tb1 in the nonvolatile memory 125. The image forming apparatus 1 then calculates a selection-RGB-value linear transformation matrix for converting the imaged reference RGB values corresponding to the selected neighboring reference color measurement values into the neighboring reference color measurement values, and converts the color-measurement-target RGB values by using the selection-RGB-value linear transformation matrix, to thereby obtain color measurement values. The image forming apparatus 1 outputs, by the recording head 20, an image of image data that has been subjected to the color conversion based on the color measurement values. Therefore, the color reproducibility of an image formed by the image forming apparatus 1 can be improved.

As illustrated in FIG. 14, when the color measurement adjustment sheet CS is set on the platen 14 or when the color measurement adjustment sheet CS is maintained on the platen 14 without being discharged after the color measurement adjustment sheet CS is recorded, the image forming apparatus 1 causes the imaging unit 30 to capture a plurality of the color-measurement-adjustment color patches CP of the color measurement adjustment sheet CS on the platen 14 and to capture the patches of the reference chart KC by controlling the movement of the carriage 6. After the imaging unit 30 simultaneously captures the color-measurement-adjustment color patches CP of the color measurement adjustment sheet CS and the patches of the reference chart KC, the image processing unit 110 of the imaging unit 30 performs necessary image processing on pieces of the image data of the color-measurement-adjustment color patches CP of the color measurement adjustment sheet CS and the image data of the reference chart KC. Thereafter, the pieces of the image data (the RGB values) of the color-measurement-adjustment color patches CP of the color measurement adjustment sheet CS are sent, as the color-measurement-target RGB values, i.e., as the device-dependent signals dependent on the device, to the color measurement control unit 106. Furthermore, the pieces of the image data (the RGB values) of the patches of the reference chart KC are sent, as the color-measured reference RGB values RdsGdsBds, to the color measurement control unit 106. The color measurement control unit 106 temporarily stores the color-measurement-target RGB values in the frame memory 121 as illustrated in FIG. 15 (Step S11).

In the color measurement control unit 106, the color measurement value calculating unit 126 of the calculating unit 124 converts the color-measurement-target RGB values stored in the frame memory 121 into the initialization color-measurement-target RGB values RsGsBs by using an inter-reference-RGB linear transformation matrix to be described later (Step S12 and S13).

The calculating unit 124 of the color measurement control unit 106 regards the converted initialization color-measurement-target RGB values RsGsBs as the color-measurement-target RGB values (Step S14), and performs a basic color measurement process, which will be described later, to obtain Lab color measurement values (Step S15).

Figure 15:
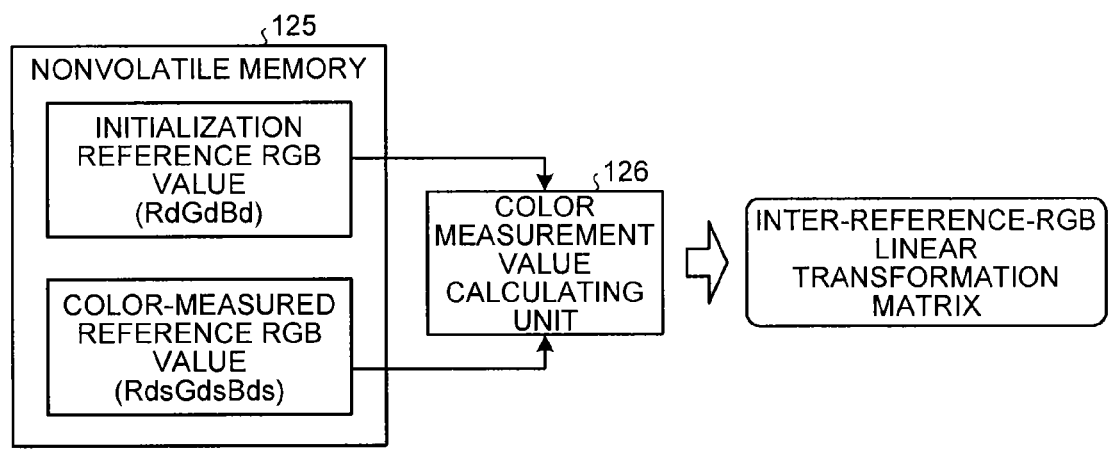
FIG. 15 is a diagram for explaining a process for generating an inter-reference-RGB linear transformation matrix.
Figure 16:
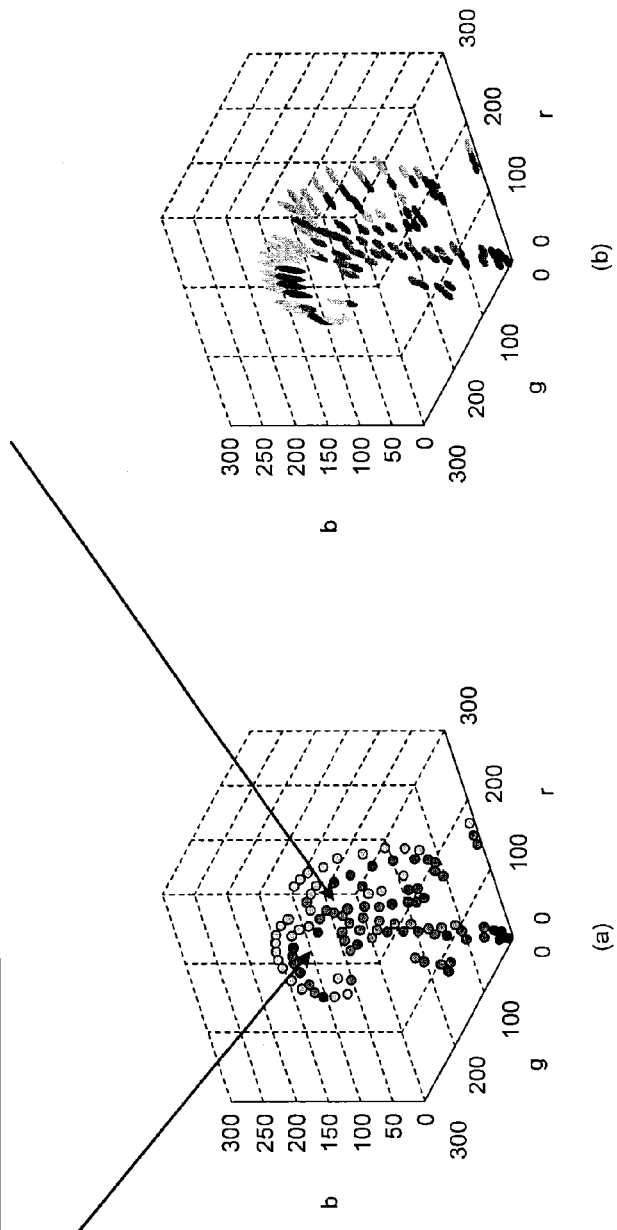
FIG. 16 is a diagram illustrating a relation between an initial reference RGB value and a color-measured reference RGB value.

In the image forming apparatus 1 of the embodiment, the color measurement value calculating unit 126 of the calculating unit 124 obtains the inter-reference-RGB linear transformation matrix as illustrated in FIG. 15 and FIG. 16.

Specifically, as illustrated in FIG. 15, the color measurement value calculating unit 126 of the calculating unit 124 reads the initial reference RGB values RdGdBd and the color-measured reference RGB values RdsGdsBds from the nonvolatile memory 125. The initial reference RGB values RdGdBd are obtained by capturing the patches of the reference chart KC at the same time when the imaging unit 30 captures the reference color patches KP of the reference sheet KS at the initial state, and are stored in the nonvolatile memory 125. The color-measured reference RGB value RdsGdsBds are obtained by capturing the patches of the reference chart KC at the same time when the imaging unit 30 captures the color-measurement-adjustment color patches CP of the color measurement adjustment sheet CS for color measurement, and are stored in the nonvolatile memory 125. The color measurement value calculating unit 126 of the calculating unit 124 calculates the inter-reference-RGB linear transformation matrix for converting the color-measured reference RGB values RdsGdsBds into the initial reference RGB values RdGdBd, and stores the calculated inter-reference-RGB linear transformation matrix in the nonvolatile memory 125.

More specifically, in FIG. 16, white points in FIG. 16(a) are plot points of the initial reference RGB values RdGdBd in the rgb space, and black points are plot points of the color-measured reference RGB values RdsGdsBds in the rgb space. As can be seen from FIG. 16(a), the color-measured reference RGB values RdsGdsBds vary from the initial reference RGB values RdGdBd. The directions of the variations in the rgb space are approximately the same but the directions of deviations vary depending on hues as indicated by arrows in FIG. 16(b). In this way, even when the patches of the same reference chart KC are captured, the RGB values vary because of, for example, a temporal change of the illumination light sources 37 or a temporal change of the two-dimensional image sensor 35.

In this way, when the variation occurs in the values obtained by capturing the same patches of the reference chart KC, and if color measurement values are obtained by using the color-measurement-target RGB values of the captured color-measurement-adjustment color patches CP of the color measurement adjustment sheet CS in the same manner as in the first embodiment, an error occurs in the color measurement values by the variations.

Therefore, the color measurement value calculating unit 126 calculates the inter-reference-RGB linear transformation matrix to convert the color-measured reference RGB values RdsGdsBds into the initial reference RGB values RdGdBd by applying an estimation method, such as a least squares method, between the initial reference RGB values RdGdBd and the color-measured reference RGB values RdsGdsBds. Subsequently, the color measurement value calculating unit 126 converts the color-measurement-target RGB values, which are obtained by capturing the color-measurement-adjustment color patches CP of the color measurement adjustment sheet CS by the imaging unit 30 and stored in the nonvolatile memory 125, into the initialization color-measurement-target RGB values RsGsBs by using the inter-reference-RGB linear transformation matrix. Thereafter, the color measurement value calculating unit 126 performs a basic color measurement process, which will be described later, on the converted initialization color-measurement-target RGB values RsGsBs being the color-measurement-target RGB values, to thereby obtain the Lab color measurement values.

The inter-reference-RGB linear transformation matrix may be a nonlinear matrix not only in a first order but also in a higher order. If the nonlinearity is high between the rgb space and the XYZ space, it is possible to improve the conversion accuracy by using a higher-order matrix.

When the imaging unit 30 captures the reference color patches KP of the reference sheet KS and the color-measurement-adjustment color patches CP of the color measurement adjustment sheet CS, which are subjects, via the opening 32c formed on the bottom surface 32a, the imaging unit 30 simultaneously captures the patches of the reference chart KC arranged on the opening 32c of the bottom surface 32a of the frame 32. Therefore, the imaging unit 30 can always capture the patches of the reference chart KC at the same positional relation with the reference color patches KP of the reference sheet KS and the color-measurement-adjustment color patches CP of the color measurement adjustment sheet CS, which are subjects, so that the patches can be captured in stable conditions.

In the imaging unit 30, the opening 32c of the frame 32 is covered by the mist preventing plate 40 except when the imaging unit 30 captures a subject. Therefore, it is possible to prevent paper powder or mist from entering the inside of the outer surface of the frame 32 via the opening 32c. Consequently, it becomes possible to maintain the inner components, such as the optical path length changing member 41, the reference chart KC, and the image sensor unit 34, in a clean state and to improve the quality of a captured image of the subject and the reference chart KC. As a result, it is possible to maintain the color measurement accuracy at a high quality.

Furthermore, in the imaging unit 30, the optical path length changing member 41 is provided inside the frame 32. Therefore, it is possible to capture the reference chart KC and a subject located outside the frame 32 at the same focal length, enabling to capture the reference chart KC and the subject with higher accuracy.

The illumination light for illuminating the imaging surface of the recording medium P via the opening 32c and the illumination light for illuminating the reference chart KC are applied by the same illumination light sources 37. Therefore, the imaging unit 30 can simultaneously capture the reference chart KC and the imaging surface of the recording medium P under the same illumination condition. The illumination light sources 37 are disposed at two positions on the center line Lo located at an approximately intermediate position between the reference chart KC and the recording medium P so as to be symmetric with respect to the lens 36. Therefore, it is possible to uniformly illuminate the reference chart KC and the imaging area of the recording medium P under approximately the same condition. Namely, the illumination light sources 37 that illuminate a subject always illuminate the reference chart KC, and therefore it is possible to illuminate the subject and the reference chart KC under approximately the same illumination condition.

Furthermore, in the imaging unit 30, the opening 32c and the reference chart KC in the imaging area are arranged so as to be approximately symmetric with respect to the center line Lo connecting the center of the lens 36 and the illumination light sources 37. Therefore, the imaging unit 30 can set the same imaging condition of the two-dimensional image sensor 35 in a line symmetric manner. As a result, it is possible to improve the accuracy of the color adjustment process or the color measurement process performed by the two-dimensional image sensor 35 using the reference chart KC.

Figure 17:
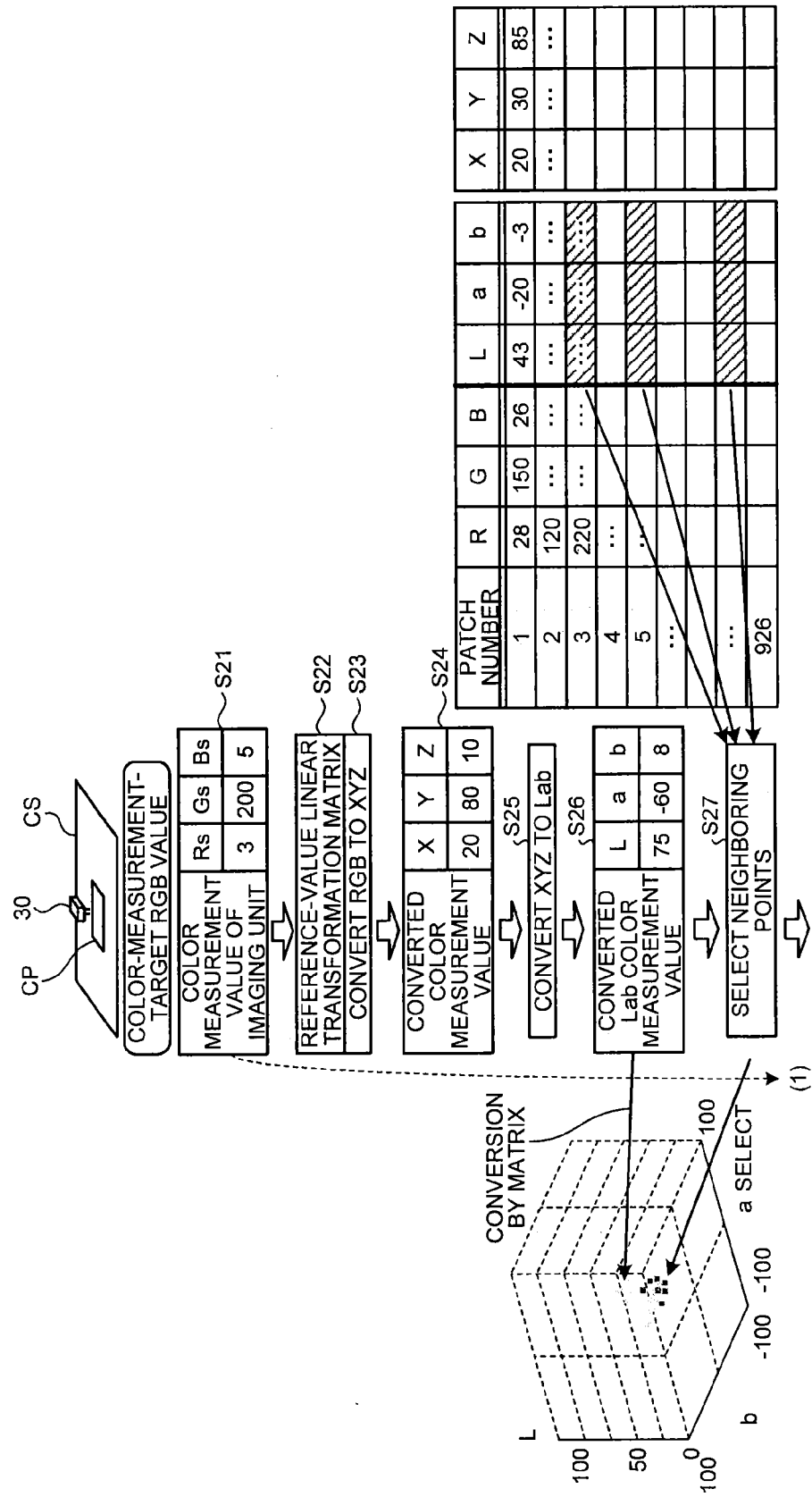
FIG. 17 is a diagram for explaining a basic color measurement process.
Figure 18:
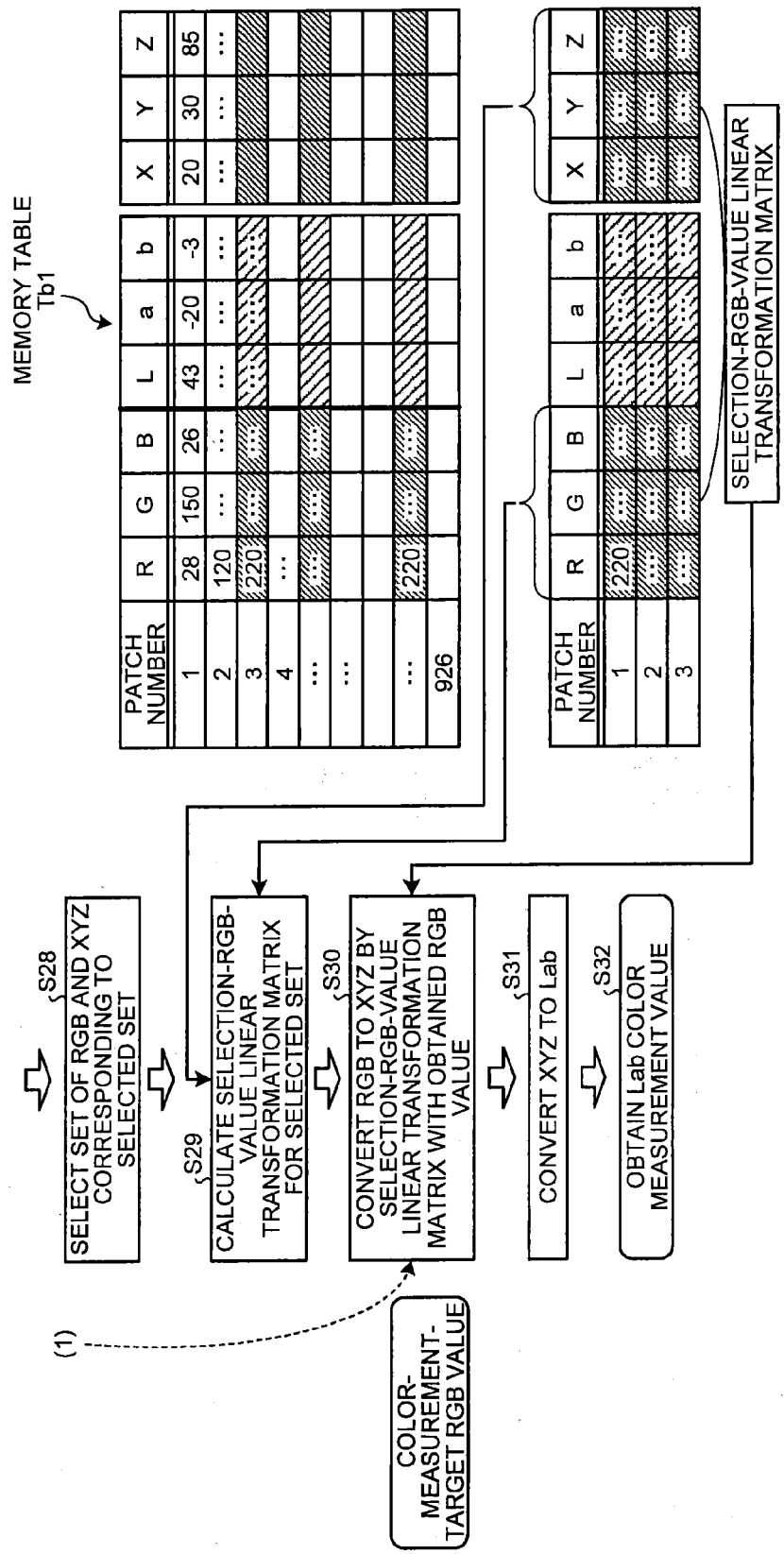
FIG. 18 is a diagram illustrating the basic color measurement process continued from FIG. 17.

After the color measurement value calculating unit 126 calculates the initialization color-measurement-target RGB values RsGsBs as described above and setting them as the color-measurement-target RGB values, as illustrated in FIG. 17 and FIG. 18, the color measurement value calculating unit 126 selects the reference color measurement values (the neighboring reference color measurement values) at close distances from the color measurement values converted to the color-measurement-target RGB values from among the reference color measurement values registered in the memory table Tb1 in the nonvolatile memory 125. The color measurement value calculating unit 126 then performs the basic color measurement process to obtain color measurement values for converting the color-measurement-target RGB values into the selected neighboring reference color measurement values. The image forming apparatus 1 outputs, by the recording head 20, an image of image data that has been subjected to the color conversion based on the color measurement Lab values. Therefore, the color reproducibility of an image formed by the image forming apparatus 1 can be improved.

Specifically, as illustrated in FIG. 17, when the imaging unit 30 captures the color-measurement-adjustment color patches CP of the color measurement adjustment sheet CS, and the color-measurement-target RGB values are stored in the nonvolatile memory 125 as described above (Step S21), the color measurement value calculating unit 126 applies the reference-value linear transformation matrix (Step S22) to convert the color-measurement-target RGB values into first XYZ values (Step S23), and stores the first XYZ values in the nonvolatile memory 125 (Step S24). For example, in FIG. 17, the color measurement value calculating unit 126 converts the color-measurement-target RGB value (3, 200, 5) into the first XYZ value (20, 80, 10) (a first color measurement value) and stores it in the nonvolatile memory 125.

The color measurement value calculating unit 126 converts the first XYZ values into the first Lab values (first color measurement values) by referring to the memory table Tb1 in the nonvolatile memory 125 or by using a known conversion equation (Step S25), and stores the first Lab values in the nonvolatile memory 125 (Step S26). For example, in FIG. 17, the color measurement value calculating unit 126 converts the first XYZ value (20, 80, 10) into the first Lab value (75, −60, 8) being an imaged color measurement value.

As illustrated in the Lab space in FIG. 17, the color measurement value calculating unit 126 searches through the reference color measurement values (the Lab values) of the color patches of a plurality of colors in the memory table Tb1 stored in the nonvolatile memory 125, and selects a set of a predetermined number of color patches (neighboring color patches) with reference color measurement values (the Lab values) at close distances from a certain first Lab value in the Lab space from among the reference color measurement values (the Lab values) (Step S27). For example, sixty color patches are selected and plotted on the Lab space illustrated in FIG. 17. The number (the predetermined number) of the color patches to be selected is not limited to sixty. As a method to select patches at the close distances, for example, a method may be applied in which distances between the first Lab value and the reference color measurement values (the Lab values) of the color patches at all of the points are calculated, and reference Lab values (in FIG. 17, the reference Lab values indicated by hatching) of the color patches at close distances from the first Lab value being the first color measurement value are selected.

As illustrated in FIG. 18, the color measurement value calculating unit 126 refers to the memory table Tb1 to select imaged reference RGB values that form pairs with the first Lab values of the selected set, i.e., sets of the imaged reference RGB values (the selected RGB values) and the reference XYZ values having the same patch numbers as that of the first Lab values of the selected set (Step S28). The color measurement value calculating unit 126 calculates the selection-RGB-value linear transformation matrix for converting between the imaged reference RGB values and the reference XYZ values of the selected set (selected set) in units of sets by using a least squares method, and stores the calculated selection-RGB-value linear transformation matrix in the nonvolatile memory 125 (Step S29).

The color measurement value calculating unit 126 obtains second XYZ values being second color measurement values from the color-measurement-target RGB values by using the selection-RGB-value linear transformation matrix obtained as described above (Step S30). The color measurement value calculating unit 126 then converts the second XYZ values into second Lab values by using a known conversion equation (Step S31), to thereby obtain final color measurement values (Step S32).

The image forming apparatus 1 adjusts an image based on the image data subjected to the color conversion using the color measurement values obtained by the color measurement value calculating unit 126, and forms an image based on the image data of the adjusted image by driving the recording head 20.

Specifically, the image forming apparatus 1 according to the embodiment applies the reference-value linear transformation matrix to the color-measurement-target RGB values, which are obtained by capturing a plurality of the color-measurement-adjustment color patches CP of the color measurement adjustment sheet CS reflecting the output characteristics of the recording head 20 at the color adjustment process timing, to thereby obtain the first Lab values obtained upon capturing the reference sheet KS in the initial state. The image forming apparatus 1 then selects sets of patches and reference Lab values at close distances from the first Lab values in the Lab space from among the reference Lab values of a plurality of the color patches registered in the memory table Tb1, and converts the color-measurement-target RGB values corresponding to the selected reference Lab values into Lab values by using the selection-RGB-value linear transformation matrix, to thereby obtain the Lab color measurement values. The image forming apparatus 1 adjusts an image based on the image data subjected to the color conversion using the obtained color measurement values, and forms an image based on the image data of the adjusted image by driving the recording head 20.

As described above, the imaging unit 30 of the image forming apparatus 1 according to the embodiment includes the frame 32 having the opening 32c, the image sensor unit (sensor unit) 34 that captures a subject located outside the frame 32 via the opening 32c, the reference chart (reference chart unit) KC that is arranged on the frame 32 and is captured by the image sensor unit 34 together with the subject, and the mist preventing plate (cover member) 40 that covers the opening 32c. Specifically, the imaging unit 30 includes the frame 32 having a predetermined box shape. The frame 32 includes, on the bottom surface 32a being an opposing surface opposite a subject, the opening 32c for capturing the subject, and the reference chart KC that provides a predetermined color reference by being captured together with the subject captured via the opening 32c. The imaging unit 30 also includes the illumination light sources 37 for illuminating the subject and the reference chart KC under approximately the same illumination condition, the image sensor unit 34 that receives reflected light from the subject opposite the opening 32c and reflected light from the reference chart KC to capture the subject and the reference chart KC, and the mist preventing plate 40 that covers the opening 32c to prevent mist (foreign matters) from entering the inside of the frame 32 with respect to the covered position.

Therefore, it is possible to prevent mist from entering the inside of the opening 32c of the frame 32 with respect to the covered position at which the opening 32c of the frame 32 is covered by the mist preventing plate 40. Consequently, is becomes possible to maintain the inner components, such as the reference chart KC and the image sensor unit 34, in a clean state and capture the subject and the color reference chart KC with high accuracy and a stable positional relation.

Furthermore, the imaging unit 30 of the image forming apparatus 1 according to the embodiment includes the optical path length changing member 41 that covers the opening 32c of the bottom surface 32a. Therefore, it is possible to capture the reference chart KC and a subject located outside the frame 32 at the same focal length. By using the mist preventing plate 40, the imaging unit 30 can prevent mist from adhering to the optical path length changing member 41 and prevent mist from entering the inside of the frame 32 via the opening 32c. Therefore, it is possible to capture the reference chart KC and the subject with higher accuracy.

Moreover, the image forming apparatus 1 according to the embodiment causes the mist preventing plate 40 to cover the opening 32c of the frame 32 of the imaging unit 30 when the image forming apparatus 1 forms a normal image and an image of a subject.

Therefore, in the situation where mist occurs, it is possible to prevent mist from entering the inside of the outer surface of the opening 32c of the frame 32 by the mist preventing plate 40, so that it becomes possible to capture the reference chart KC and a subject with higher accuracy.

A case has been explained above that, when a subject is to be captured, the mist preventing plate 40 is dismounted and the subject is captured through the opening 32c. However, the way to use the mist preventing plate 40 is not limited to the above example. For example, if the mist preventing plate 40 is made of a transparent material as described above, it may be possible to always mount the mist preventing plate 40 on the imaging unit 30. In this case, it may be possible to dismount the mist preventing plate 40 from the imaging unit 30 and replace the mist preventing plate 40 with a new and clean one before a subject is captured, or to dismount and clean the mist preventing plate 40 and re-mount the mist preventing plate 40 so that a subject can be captured while the mist preventing plate 40 is mounted on the imaging unit 30.

With this configuration, it becomes possible to prevent mist from entering the inside of the opening 32c of the frame 32 even when a subject is captured.

Figure 19:
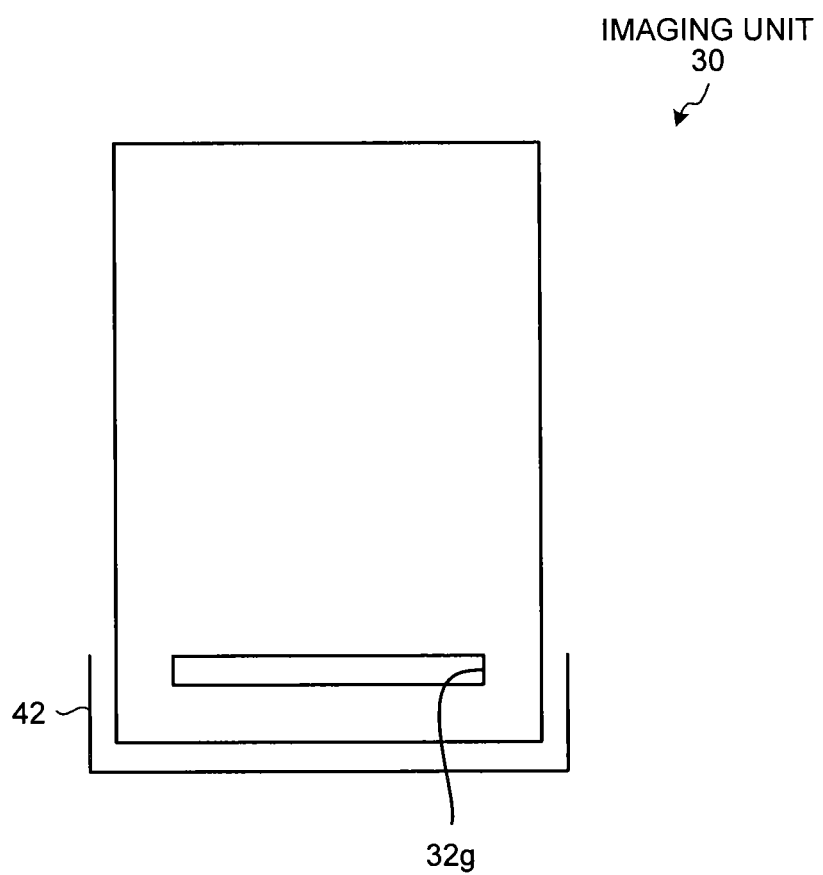
FIG. 19 is a side view of the imaging unit in which an opening is covered by a polyester film.

As illustrated in FIG. 19, in the imaging unit 30, the opening 32c may be covered by a polyester film (cover member) 42. In FIG. 19, to clearly illustrate the polyester film 42, the polyester film 42 is separated from the frame 32. However, in actuality, the polyester film 42 is attached to the frame 32 so as to closely come into contact with and cover the bottom surface (at least the bottom surface covering the opening 32c) from the outer surface side of the frame 32. It may be possible to not only use both of the mist preventing plate 40 and the polyester film 42 but also use only the polyester film 42 to cover the opening 32c.

In this case, for example, the polyester film 42 is made of a transparent member in the form of a thin film with t=0.118. As the polyester film 42, for example, a polyester film called Mylar (registered trademark) may be used. It may also be possible to remove the polyester film 42 when a subject is captured, or to attach a plurality of films in a stacked manner so that the films can be removed one by one when a subject is captured.

With this configuration, it is possible to prevent mist from entering the inside of the outer surface of the frame 32 by a simple structure. Therefore, it is possible to prevent inner components, such as the optical path length changing member 41, the image sensor unit 34, and the reference chart KC, inside the frame 32 from getting dirty with the mist and to reduce the size and costs of the imaging unit 30 that can stably capture the reference chart KC and a subject with high accuracy.

Figure 20:
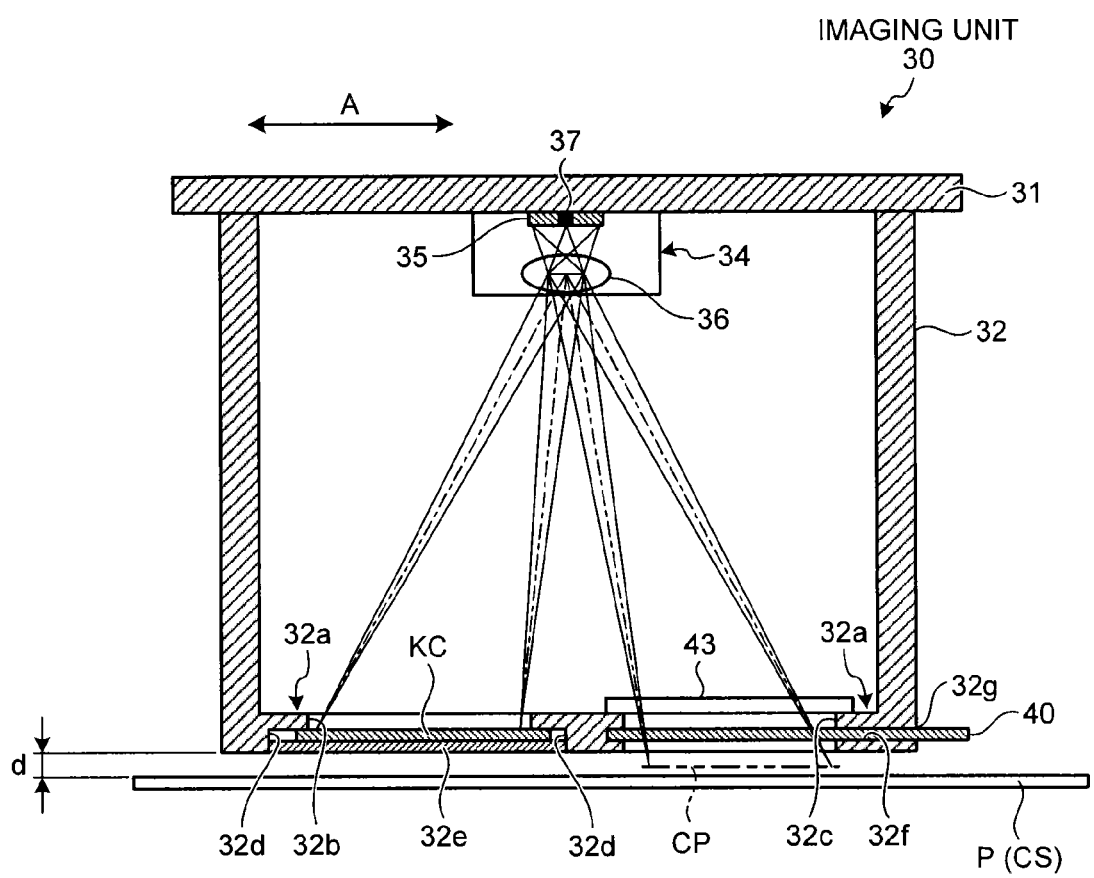
FIG. 20 is a front cross-sectional view of the imaging unit including the polyester film at the opening.
Figure 21:
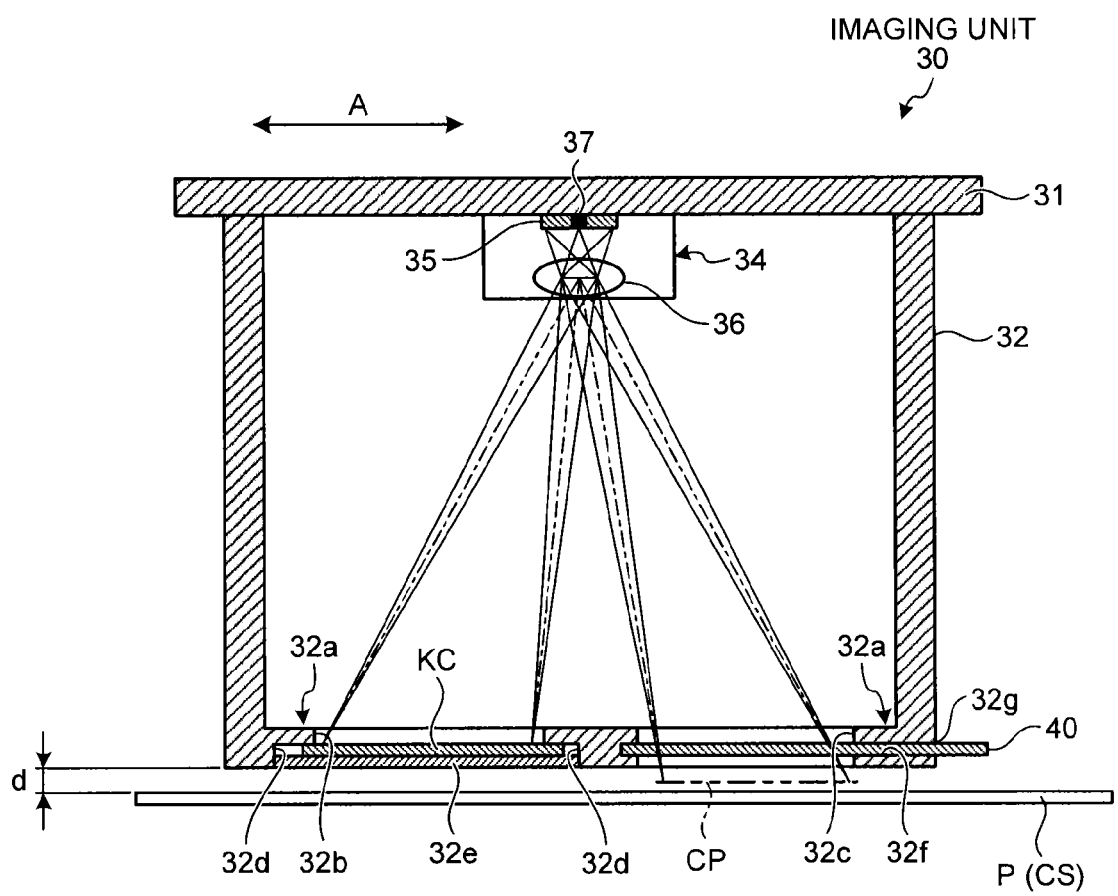
FIG. 21 is a front cross-sectional view of the imaging unit without an optical path length changing member.

Furthermore, as illustrated in FIG. 20, when a distance difference between the reference chart KC and a subject is adequately small, it may be possible to provide, in the imaging unit 30, a polyester film 43 for preventing mist from entering the inside of the frame 32 such that the polyester film 43 covers the opening 32c from the inner side of the frame, without providing the optical path length changing member 41 at the opening 32c. Moreover, as illustrated in FIG. 21, it may be possible to remove the polyester film 42 when a subject is captured in order that the opening 32c can be prevented from being covered by the polyester film 42.

In this way, if the optical path length changing member 41 is omitted, the configuration of the imaging unit 30 can be simplified. As for the mist, it is possible to prevent the mist from entering the inside with respect to the outer surface of the opening 32c of the frame 32 by the mist preventing plate 40. Furthermore, if the polyester film 43 is provided, it is possible to prevent the mist from entering the inside with respect to the inner surface of the opening 32c by the polyester film 43. Therefore, it is possible to capture a subject with high accuracy, with a simple configuration, and at low costs.

Figure 22:
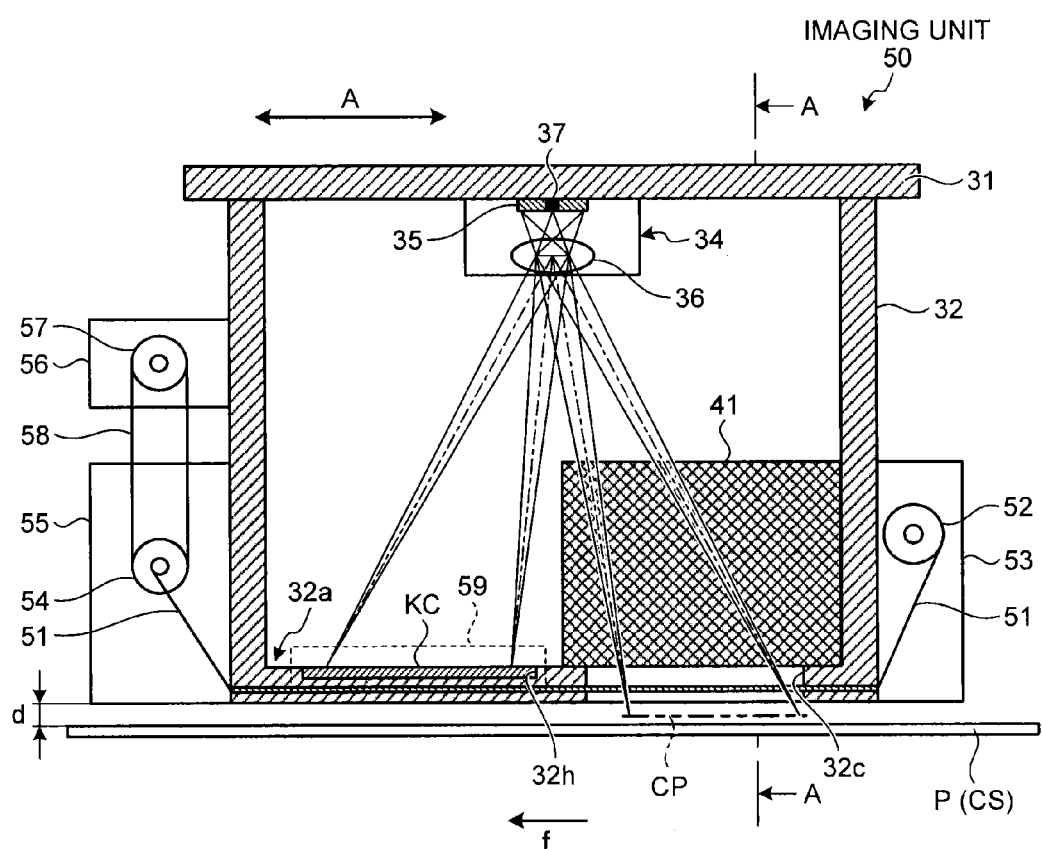
FIG. 22 is a front cross-sectional view of an imaging unit including a wind-up polyester film.
Figure 23:
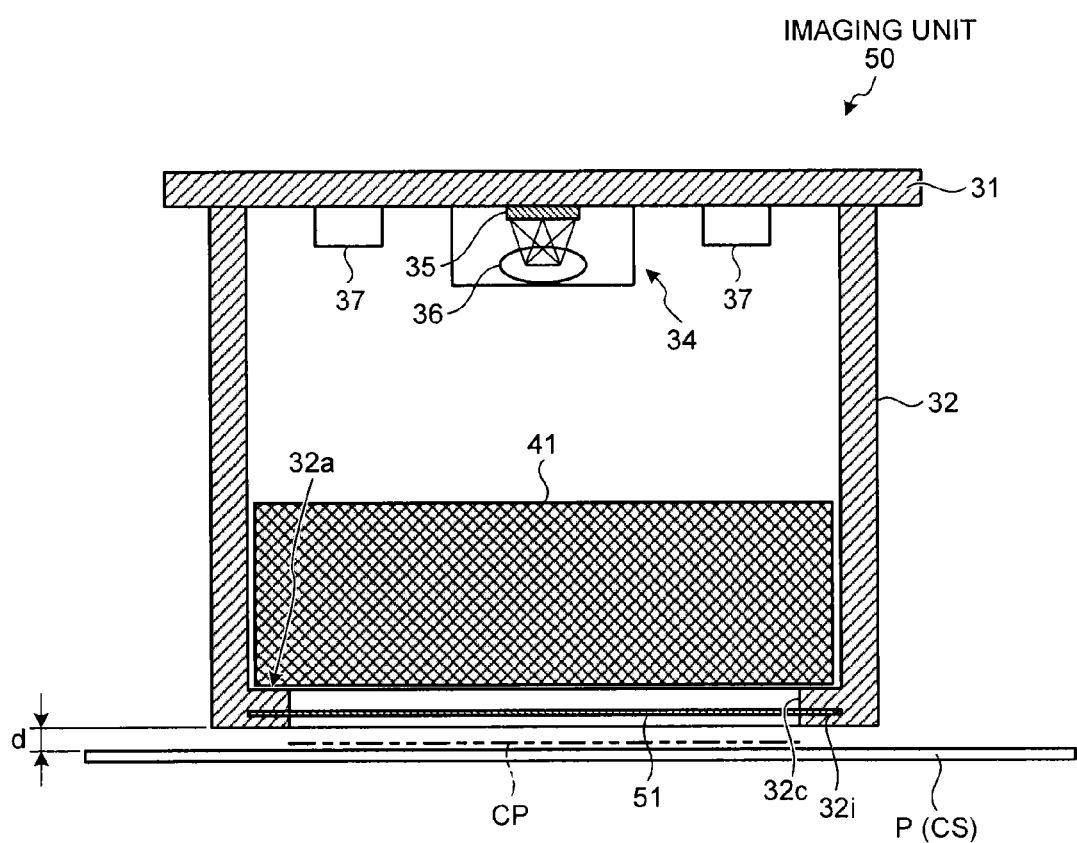
FIG. 23 is a cross-sectional view of the imaging unit viewed in a direction of arrow A-A in FIG. 22.

The configuration for preventing mist from entering the inside of the frame 3 is not limited to the above configuration. For example, as exemplified by an imaging unit 50 illustrated in FIG. 22 and FIG. 23, it may be possible to wind up a predetermined amount of a wind-up polyester film (cover member) 51 from one direction to the other direction at an appropriate timing so that a clean portion of the wind-up polyester film 51 can be located at the position of the opening 32c at least at the time of capturing an image. In FIG. 22 and FIG. 23, the same components as those of the imaging unit 30 illustrated in FIG. 4 to FIG. 6 are denoted by the same reference numerals and symbols, and explanation thereof will be omitted.

Specifically, in the imaging unit 50, a feed film roll 52 and a cover 53 for covering the feed film roll 52 are mounted on the outer surface of the frame 32 on the opening 32c side in the main-scanning direction. Besides, a wind-up film roll 54, a cover 55 for covering the wind-up film roll 54, and a wind-up motor 56 are mounted on the outer surface of the frame 32 on the reference chart KC side in the main-scanning direction. The feed film roll 52 and the wind-up film roll 54 are mounted in an easily-replaceable manner.

A pulley 57 is mounted on a motor shaft of the wind-up motor 56. The pulley 57 and the wind-up film roll 54 are connected to each other by a belt 58. The wind-up motor 56 is, for example, rotated clockwise in FIG. 21 under the control of the CPU 101, thereby rotating the wind-up film roll 54 clockwise via the belt 58.

The wind-up polyester film 51 is wound around the feed film roll 52 in a roll form. The leading end of the wind-up polyester film 51 is wound around the wind-up film roll 54.

Similarly to the polyester film 42 as described above, the wind-up polyester film 51 is made of, for example, a transparent material in the form of a thin film with t=0.118, and may be formed by using a polyester film called Mylar.

In the imaging unit 50, as illustrated in FIG. 23, an L-shaped groove 32i extending in the main-scanning direction is formed on the surface of the bottom surface 32a of the frame 32 on the recording medium P side, and the wind-up polyester film 51 passes through the inside of the groove 32i. A method to pass the wind-up polyester film 51 through the bottom surface 32a of the frame 32 in the main-scanning direction is not limited to the method to form the L-shaped groove 32i. For example, it may be possible to form a through hole through which the wind-up polyester film 51 can pass in the main-scanning direction and cause the wind-up polyester film 51 to pass through the through hole.

In the imaging unit 50, a recess 32h (see FIG. 24) with approximately the same size as the opening 32c is formed at the position symmetric to the opening 32c with respect to the image sensor unit 34 on the bottom surface 32a of the frame 32. The reference chart KC is mounted on the recess 32h by being inserted in a removable manner.

As a method to mount the reference chart KC on the recess 32h, for example, it may be possible to provide an open-close door 59 that can open and close the recess 32h on the side wall surface of the frame 32 in the sub-scanning direction (the direction perpendicular to the direction A) as indicated by a dashed line in FIG. 22, and attach and detach the reference chart KC to and from the inside of the recess 32h by opening the open-close door 59. As a method to attach and detach the reference chart KC to and from the recess 32h, it may be possible to dismount the substrate 31 from the frame 32 and attach and detach the reference chart KC to and from the recess 32h via the open portion.

Therefore, in the imaging unit 50, when the wind-up film roll 54 is rotated clockwise by the wind-up motor 56 via the belt 58, the wind-up film roll 54 winds up the wind-up polyester film 51 fed from the feed film roll 52 as indicated by an arrow f in FIG. 22.

The imaging unit 50 winds up the wind-up polyester film 51 by the amount corresponding to a predetermined one step at the time of capturing a subject in order that a clean portion of the wind-up polyester film 51 can be located at the position of the opening 32c to capture a subject located outside the frame 32.

The one step corresponds to, for example, the length of the opening 32c in the main-scanning direction plus α. The length α is set to a length corresponding to a feed error of the wind-up polyester film 51 or the adequate amount of movement by which a region that may contain dirt near the opening 32c can be moved away from the opening 32c.

At the time of capturing an image, the image forming apparatus 1 drives the wind-up motor 56 by one step by taking the used amount of ink or an ink ejection time at the image formation into account, and causes the wind-up film roll 54 to wind up the wind-up polyester film 51. In an abnormal situation, in which ink adheres to the wind-up polyester film 51 when the recording medium P is jammed or color measurement data greatly varies, the CPU 101 may automatically rotate the wind-up motor 56 to wind up the wind-up polyester film 51 by one step.

On the opening 32c inside the frame 32 of the imaging unit 50, the optical path length changing member 41 that is the same as described above is provided so as to close the opening 32c.

Therefore, it is possible to capture the reference chart KC and a subject located outside the frame 32 via the opening 32c with high accuracy.

Furthermore, in the imaging unit 50, the reference chart KC is attached to the recess 32h formed on the bottom surface 32a of the frame 32. Therefore, it becomes possible to shorten an imaging distance between the reference chart KC and a subject on the recording medium P through the opening 32c, enabling to capture the reference chart KC and the subject with high accuracy.

With this configuration, at the time of capturing a subject, it is possible to reliably prevent mist from entering the inside of the frame 32 by winding up the wind-up polyester film 51 by one step and thereafter capturing the subject. Furthermore, it is possible to capture a subject always via a clean portion of the wind-up polyester film 51. Therefore, it is possible to capture the reference chart KC and the subject with high accuracy.

Figure 24:
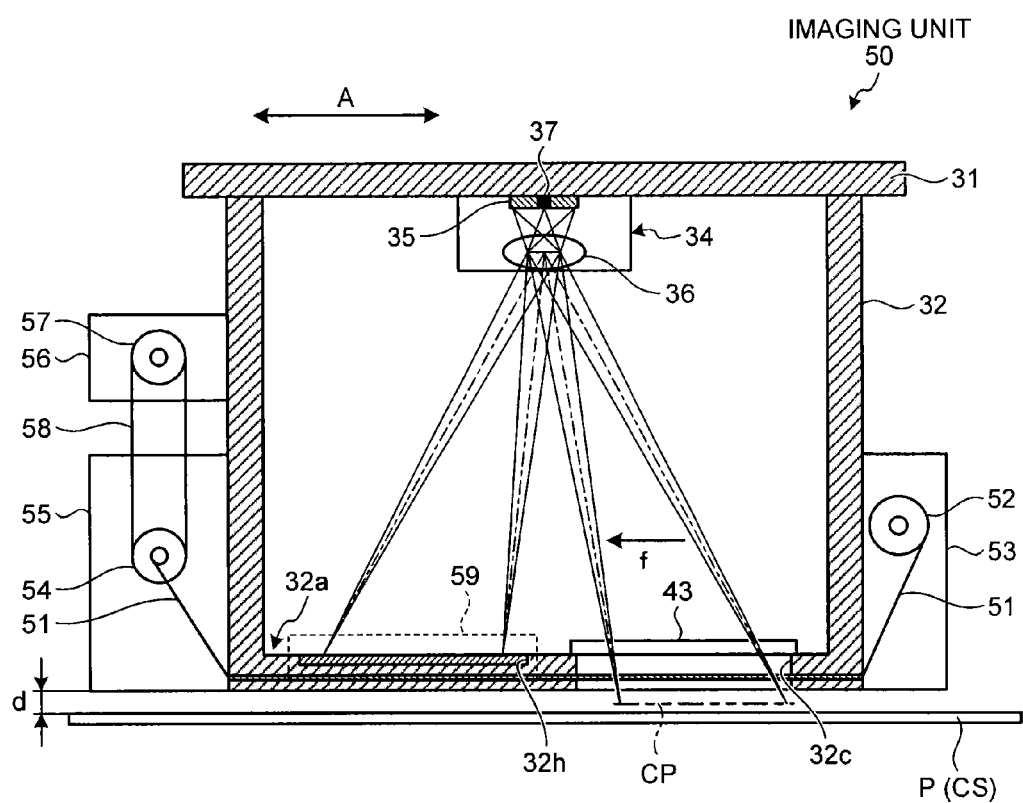
FIG. 24 is a front cross-sectional view of the imaging unit that includes the polyester film at the opening and includes the wind-up polyester film.

In FIG. 22 and FIG. 23, a case is illustrated in which the optical path length changing member 41 is provided inside the frame 32 of the imaging unit 50. However, if a distance difference between the reference chart KC and a subject is within the focal depth of the lens 36, the optical path length changing member may be omitted as illustrated in FIG. 24. In this case, as illustrated in FIG. 24, it may be possible to provide the polyester film 43 so as to close the opening 32c in order to prevent the reference chart KC and the image sensor unit 34 from getting dirty with mist that has entered the inside of the frame 32 via the opening 32c. It may also be possible not to provide the polyester film 43 depending on the state of mist.

The configuration for preventing mist from entering the inside of the frame 32 is not limited to the above configuration. For example, as exemplified by an imaging unit 60 illustrated in FIG. 25 to FIG. 29, it may be possible to provide a shutter 61 that can open and close the opening 32c on the bottom surface 32a of the frame 32, and move the shutter 61 in a direction in which the opening 32c is closed at least when a normal image is formed or when the color-measurement-adjustment color patches CP of the color measurement adjustment sheet CS are formed. In FIG. 22 to FIG. 26, the same components as those of the imaging unit 30 illustrated in FIG. 4 to FIG. 6 are denoted by the same reference numerals and symbols, and explanation thereof will be omitted.

Figure 25:
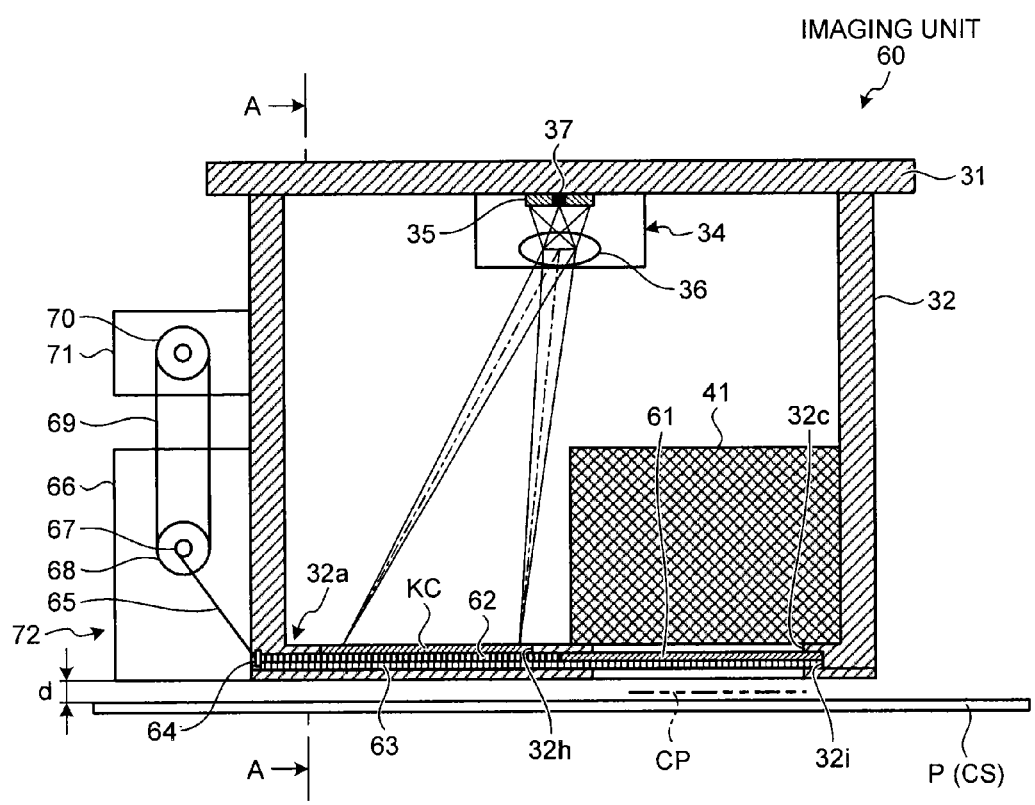
FIG. 25 is a front cross-sectional view of an imaging unit when a shutter closes the opening.
Figure 26:
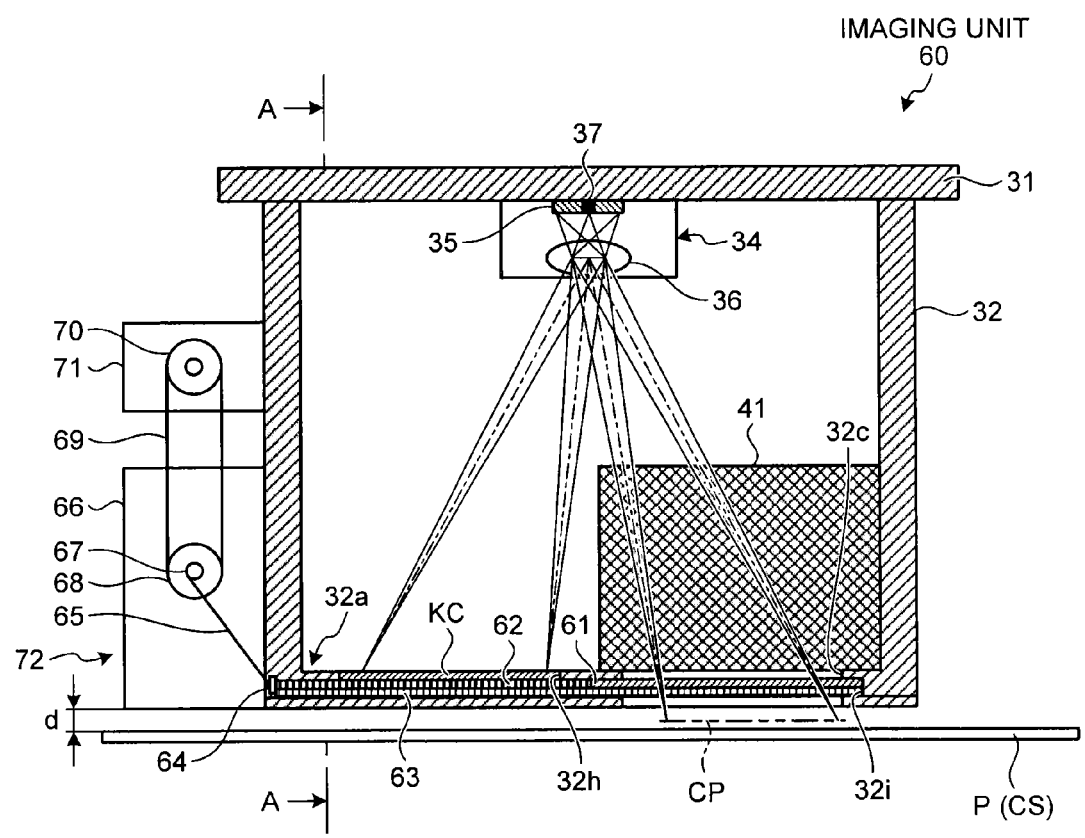
FIG. 26 is a front cross-sectional view of the imaging unit when the shutter opens the opening.
Figure 27:
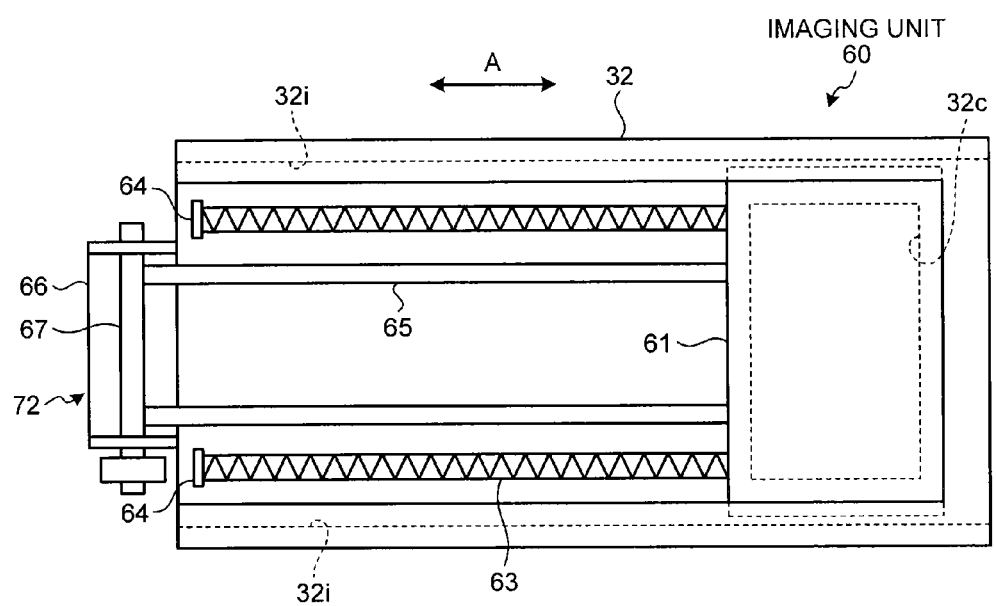
FIG. 27 is a bottom view of the imaging unit when the shutter closes the opening.
Figure 28:
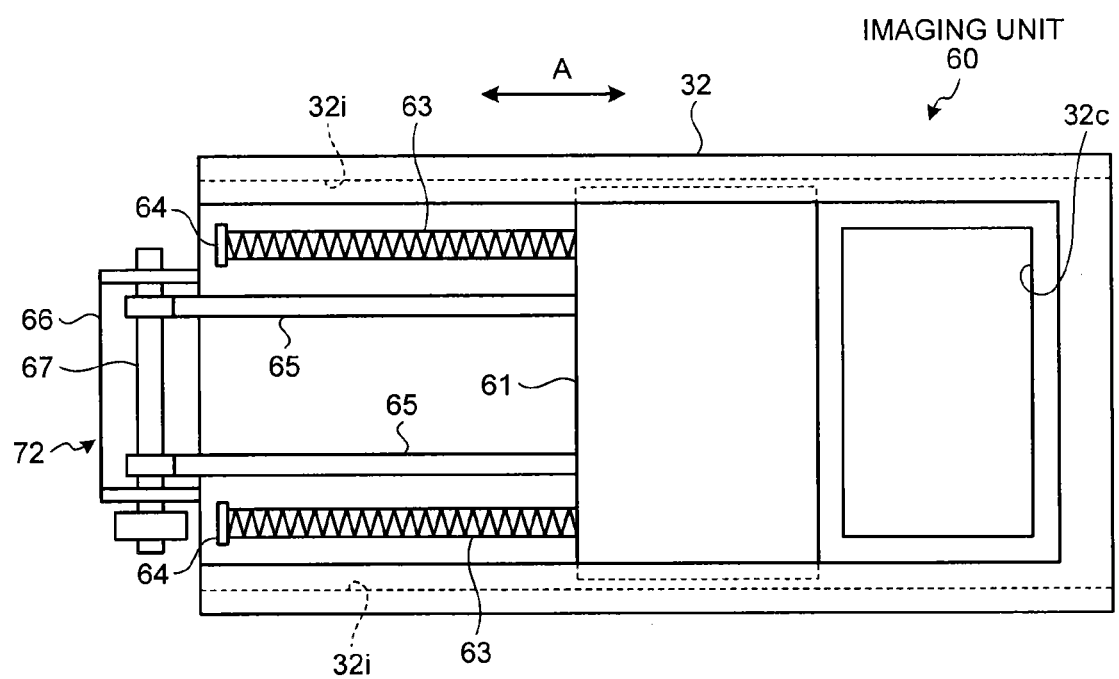
FIG. 28 is a bottom view of the imaging unit when the shutter opens the opening.
Figure 29:
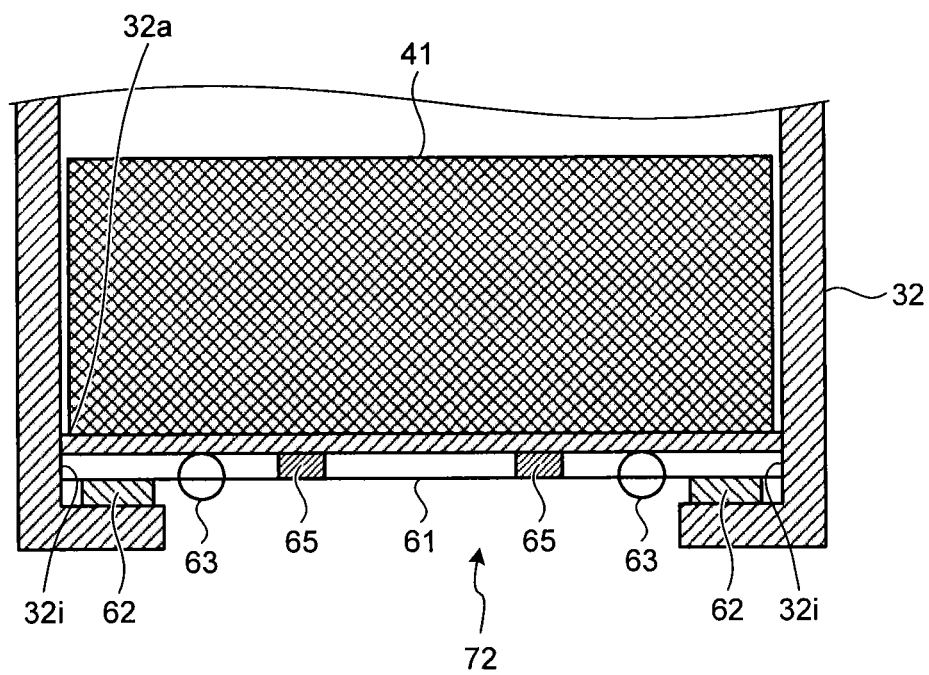
FIG. 29 is a cross-sectional view of the imaging unit viewed in a direction of arrow A-A in FIG. 25.

Specifically, in the imaging unit 60, as illustrated in FIG. 25 and FIG. 26, the shutter (cover member) 61 is supported by the bottom surface 32a of the frame 32 so as to move in the main-scanning direction (the direction A) to open and close the opening 32c. For example, as illustrated in FIG. 29 that is a cross-sectional view taken along a line A-A in FIG. 25, the shutter 61 is movably supported by a pair of L-shaped grooves 32i extending in the main-scanning direction on the lower side of the bottom surface 32a via a seal 62. As illustrated in FIG. 25 and FIG. 26, the grooves 32i are opened with respect to the side surface of the frame 32 on the reference chart KC side. However, on the opening 32c side, the grooves 32i ends while being inserted in the frame 32 by a predetermined amount through the opening 32c and are not opened with respect to the side surface of the frame 32 on the opening 32c side.

The shutter 61 is made of, for example, thermoplastic resin with t=1 (ABS resin: Acrylonitrile-Butadiene-Styrene copolymerization synthetic resin). The shutter 61 is formed with a size such that at least when the shutter 61 moves to the position of the opening 32c and comes in contact with the end face of the grooves 32i on the opening 32c side, the shutter 61 can close the opening 32c to prevent mist, such as paper powder or ink powder, from entering the inside of the outer surface of the opening 32c.

As illustrated in FIG. 25 to FIG. 29, one ends of compression springs (biasing means) 63 as a pair are fixed to the side end surface of the shutter 61 in the main-scanning direction on the reference chart KC side. The other ends of the compression springs 63 are fixed to a stopper 64 that is formed between the grooves 32i that are formed as a pair on both ends of the lower side of the bottom surface 32a of the frame 32 in the sub-scanning direction.

Therefore, the shutter 61 is always biased toward the opening 32c by the compression springs 63 by a predetermined biasing force.

Furthermore, as illustrated in FIG. 25 to FIG. 29, one ends of thin flat plates 65 as a pair are fixed to the side end surface of the shutter 61 in the main-scanning direction on the reference chart KC side. The other ends of the thin flat plates 65 are fixed to and wound around a wind-up roller 67 that is mounted on the side surface of the frame 32 in the main-scanning direction on the reference chart KC side via a cover 66.

The wind-up roller 67 is connected to a rotation shaft of a pulley 68. The pulley 68 is connected to a pulley 70 by a belt 69. The pulley 70 is fixed to a rotation shaft of a wind-up motor 71 that is fixed to the side surface of the frame 32. When the pulley 70 is rotated by the wind-up motor 71, the pulley 68 is rotated via the belt 69, so that the wind-up roller 67 rotates in the same direction.

When the wind-up roller 67 rotates clockwise, the imaging unit 60 winds up the thin flat plates 65 to draw the shutter 61 from the opening 32c so that the opening 32c can be opened.

When the wind-up roller 67 rotates counterclockwise, the imaging unit 60 releases the thin flat plates 65, so that the shutter 61 moves toward the opening 32c due to the biasing force of the compression springs 63 and the opening 32c is closed. Namely, the thin flat plates 65, the cover 66, the wind-up roller 67, the pulley 68, the belt 69, the pulley 70, and the wind-up motor 71 as a whole function as a movement driving unit (movement driving means) 72 that moves the shutter 61 serving as the cover member to a position separated from the opening 32c against the biasing force of the compression springs 63 serving as a biasing means.

In the imaging unit 60, the optical path length changing member 41 as described above is provided so as to close the opening 32c at a portion where the opening 32c is formed on the bottom surface 32a.

At least when a normal image is formed or when the color-measurement-adjustment color patches CP of the color measurement adjustment sheet CS are formed, the imaging unit 60 stops drive of the wind-up motor 71 or to cause the wind-up motor 71 to rotate counterclockwise under the control of the CPU 101 or the like in order to move, by the compression springs 63, the shutter 61 to a position where the opening 32c can be closed (covered). Therefore, it is possible to prevent the optical path length changing member 41 from getting dirty with mist due to image forming operations or the like.

At least at an imaging timing of a subject, the imaging unit 60 drives the wind-up motor 71 to rotate the wind-up roller 67 clockwise under the control of the CPU 101 or the like in order to wind up the thin flat plates 65 by the wind-up roller 67 against the biasing force of the compression springs 63, so that the shutter 61 moves from the position of the opening 32c to a downstream position of the reference chart KC (the position separated from the opening 32c) and the opening 32c is opened.

Specifically, when forming a normal image or the color-measurement-adjustment color patches CP of the color measurement adjustment sheet CS, the imaging unit 60 moves the shutter 61 by the compression springs 63 to a position where the opening 32c is closed (a first position) before the recording head 20 ejects ink. Subsequently, after a lapse of at least a predetermined time that is determined in advance as a time needed until the mist settles after the recording head 20 has ejected ink, and if a time to capture a subject comes, the imaging unit 60 winds up the thin flat plates 65 by the wind-up roller 67 against the biasing force of the compression springs 63, and moves the shutter 61 to a position (a second position) separated from the opening 32c so that the opening 32c can be opened. Therefore, the imaging unit 60 can capture a subject, such as the color measurement adjustment sheet CS, located outside the frame 32 via the reference chart KC in a clean state and the optical path length changing member 41 in a clean state with high accuracy, so that the color measurement process can be performed with high accuracy.

Figure 30:
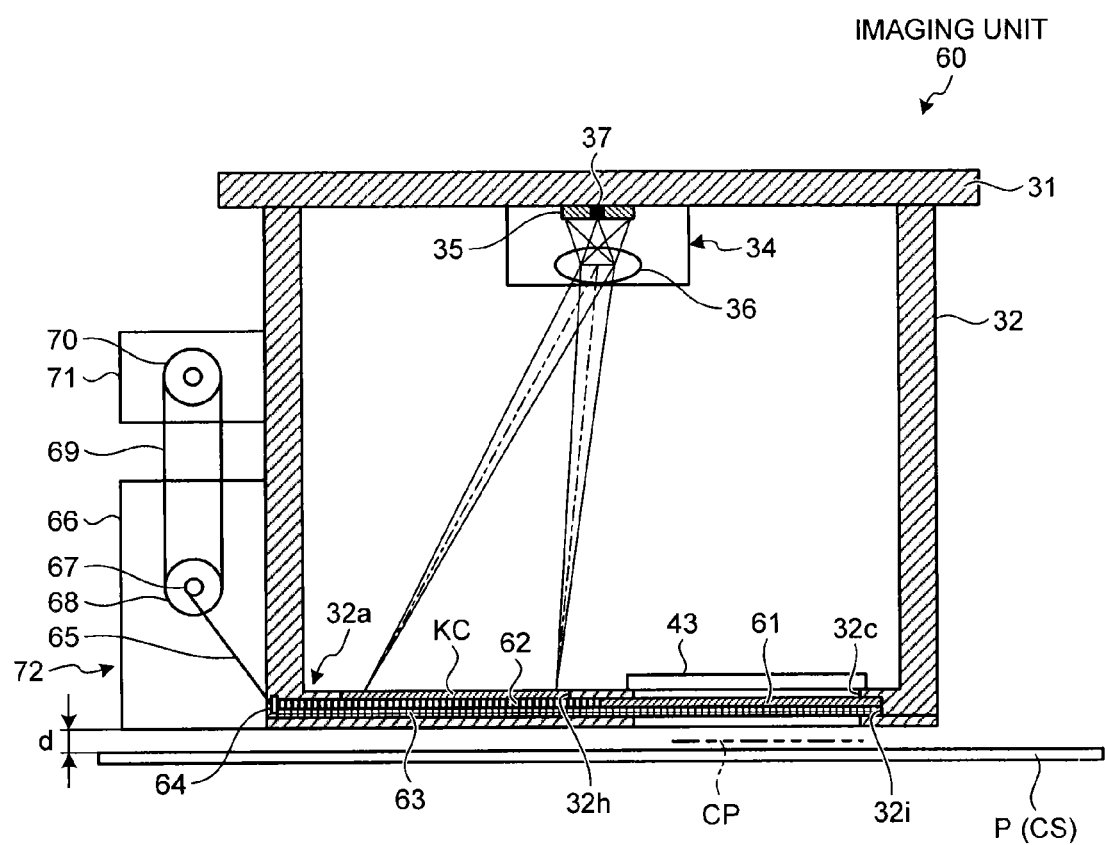
FIG. 30 is a front cross-sectional view of the imaging unit in which the polyester film is provided at the opening and the shutter closes the opening.
Figure 31:
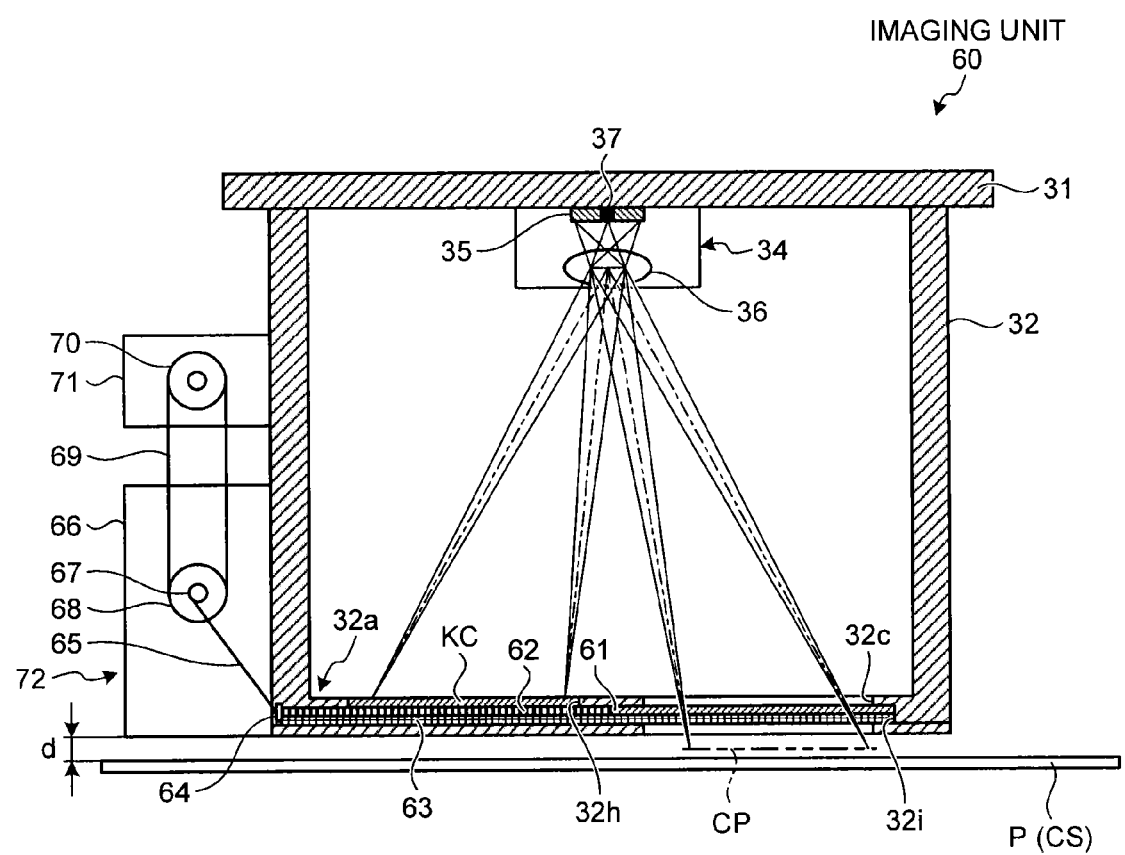
FIG. 31 is a front cross-sectional view of the imaging unit in which the optical path length changing member is not provided at the opening and the shutter closes the opening.

As illustrated in FIG. 30 and FIG. 31, when a distance difference between the reference chart KC and a subject is adequately small, it may be possible to provide, in the imaging unit 60, the polyester film 43 for preventing mist from entering the inside of the frame 32 such that the polyester film 43 covers the opening 32c from the inside of the frame 32, without providing the optical path length changing member 41 at the opening 32c. As illustrated in FIG. 31, it may be possible to close the opening 32c by only the shutter 61 without providing the optical path length changing member 41 or the polyester film 43.

In this way, if the optical path length changing member 41 is omitted, the configuration of the imaging unit 60 can be simplified. As for the mist, it is possible to prevent the mist from entering the inside of the outer surface of the opening 32c of the frame 32 by the shutter 61. Furthermore, if the polyester film 43 is provided, it is possible to prevent the mist from entering the inside of the inner surface of the opening 32c by the polyester film 43. Therefore, it is possible to capture a subject with high accuracy, with a simple configuration, and at low costs.

As described above, the imaging unit 60 causes the shutter 61 to close the opening 32c at least when forming a normal image or the color-measurement-adjustment color patches CP of the color measurement adjustment sheet CS, and moves the shutter 61 to a position separated from the opening 32c to open the opening 32c when capturing a subject. However, it is desirable for the imaging unit 60 to close the opening 32c by the shutter 61 not only when normal images or the color-measurement-adjustment color patches CP of the color measurement adjustment sheet CS are formed but also when the recording head 20 mounted on the carriage 6 flushes ink.

Figure 32:
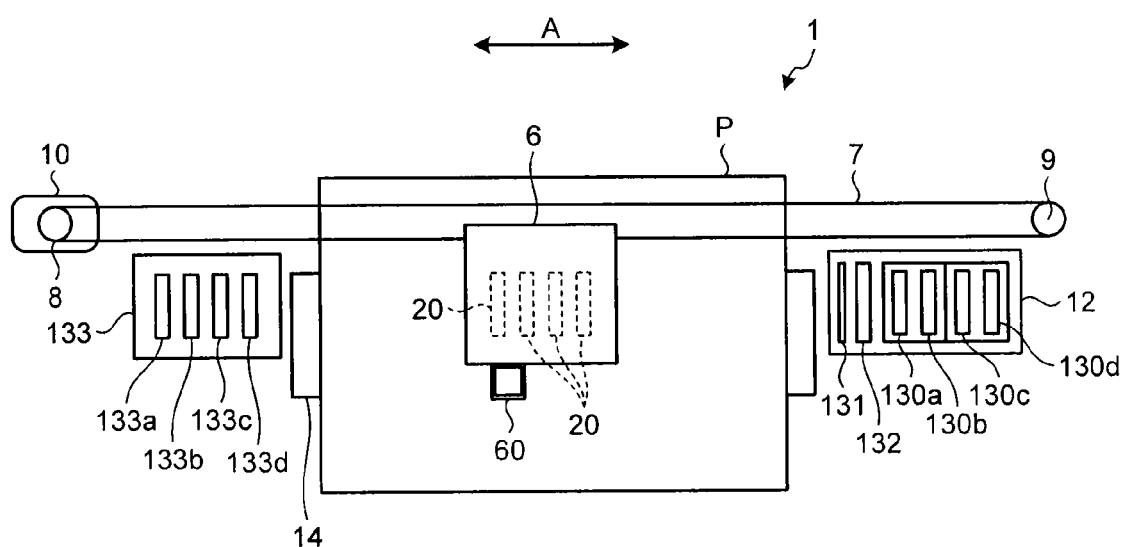
FIG. 32 is a plan view of the image forming apparatus including a maintenance mechanism.
Figure 33:
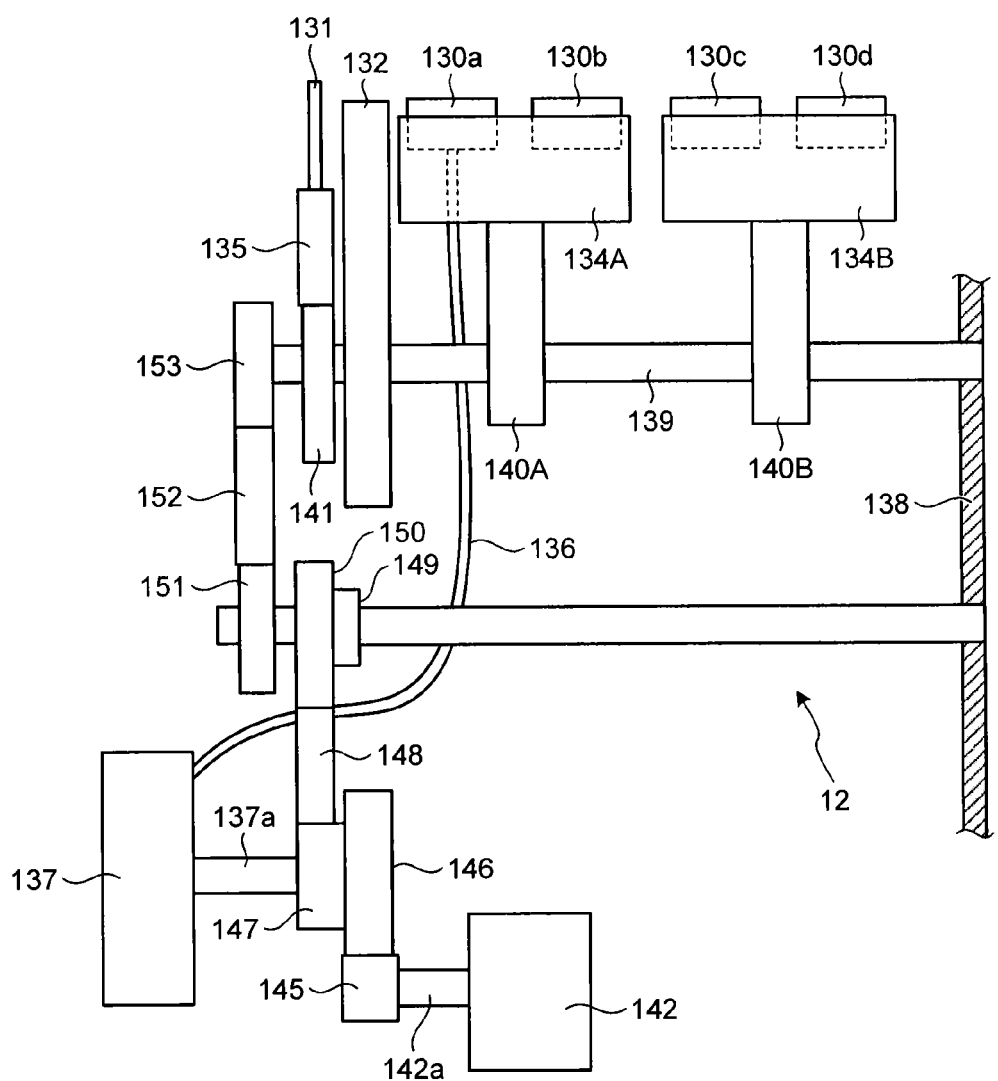
FIG. 33 is an enlarged side view of the maintenance mechanism.

As described above, the maintenance mechanism 12 maintains the reliability of the recording head 20 by cleaning the discharge surface, performing capping, or discharging unnecessary ink. The maintenance mechanism 12 will be explained in detail below with reference to FIG. 32 and FIG. 33. FIG. 32 is a plan view of the image forming apparatus 1 including the maintenance mechanism 12. FIG. 33 is an enlarged side view of the maintenance mechanism 12. The same components as those explained above with reference to FIG. 2 are denoted by the same reference numerals and symbols, and the same explanation will be omitted appropriately.

As illustrated in FIG. 32, in the image forming apparatus 1 according to the embodiment, the maintenance mechanism 12 is disposed in one side of a non-print region in the main-scanning direction (in the direction of arrow A in FIG. 32) (a region in which the carriage 6 can move but printing is not performed).

The maintenance mechanism 12 includes caps 130a to 130d for capping the nozzle surfaces of the recording heads 20 (hereinafter, when the caps need not be distinguished from one to the other, they are collectively described as the caps 130), a wiper blade 131 for wiping the nozzle surfaces, a flushing receiver 132 for receiving drops when the recording head 20 flushes ink. The cap 130a is a suction cap for sucking ink and moisturizing the nozzle surfaces, and the other caps 130b to 130d are moist caps for only moisturizing the nozzle surfaces.

In the image forming apparatus 1 according to the embodiment, a flushing receiver 133 is disposed in the other side of the non-print region in the main-scanning direction in order to receive drops when the recording head 20 flushes ink. Openings 133a to 133d are arranged on the flushing receiver 133 along a direction of the nozzle array of the recording head 20.

In the image forming apparatus 1 according to the embodiment, the carriage 6 waits at the position of the maintenance mechanism 12 while waiting for printing (image formation). At this time, the nozzle surfaces of the recording head 20 mounted of the carriage 6 are capped by the caps 130. Therefore, it becomes possible to maintain the moist state of the nozzle surfaces and prevent a discharge failure due to dried ink. Furthermore, an ink suction operation for sucking and discharging thickened ink or air bubbles by a suction pump is performed on the recording head 20 being capped by the cap 130a. In the image forming apparatus 1 according to the embodiment, the recording head 20 performs a flushing operation to discharge unnecessary ink before a start of image formation or during the image formation. Therefore, the stability of discharging performance of the recording heads 20 can be maintained.

As illustrated in FIG. 33, the caps 130a and 130b are supported by a cap holder 134A. The caps 130c and 130d are supported by a cap holder 134B. The wiper blade 131 is supported by a blade holder 135.

The cap 130a is connected to a suction pump 137 via a flexible tube 136. Therefore, the ink suction operation can be performed on the recording head 20 capped by the cap 130a by operating the suction pump 137. Therefore, by selectively moving the recording head 20 that needs to be subjected to the ink suction operation to a position where the recording head 20 can be capped by the cap 130a and thereafter performing the ink suction operation, it is possible to restore the reliability of the recording head 20.

A cam shaft 139 rotatably supported by a frame 138 is disposed below the cap holders 134A and 134B. Cap cams 140A and 140B that lift up and down the cap holders 134A and 134B, respectively, and a wiper cam 141 that lifts up and down the blade holder 135 are connected to the cam shaft 139.

A motor 142 is provided to rotate the suction pump 137 and the cam shaft 139. A motor gear 145 is mounted on a rotary shaft 142a of the motor 142. A pump gear 146 is mounted on a rotary shaft 137a of the suction pump 137. The motor gear 145 and the pump gear 146 engage with each other to transmit rotation of the motor 142 to the suction pump 137.

An intermediate gear 147 integrated with the pump gear 146 is mounted on the rotary shaft 137a of the suction pump 137. The intermediate gear 147 is engaged with an intermediate gear 150 having a one-way clutch 149 via an intermediate gear 148. A cam gear 153 fixed to the cam shaft 139 is engaged with an intermediate gear 151 that is coaxial to the intermediate gear 150 via an intermediate gear 152.

In the maintenance mechanism 12, when the motor 142 rotates in the normal direction, the motor gear 145, the pump gear 146, the intermediate gear 147, the intermediate gear 148, the intermediate gear 150 are rotated along with the rotation of the motor 142. Due to the rotation of the rotary shaft 137a of the suction pump 137, the suction pump 137 is caused to suck the inside of the cap 130a. Therefore, thickened ink or air bubbles are sucked and discharged from the recording head 20 capped by the cap 130a. At this time, transmission of the rotation of the motor 142 to the intermediate gear 151, the intermediate gear 152, and the cam gear 153 is blocked by the one-way clutch 149, so that the gears 151 to 153 do not rotate (operate).

When the motor 142 rotates in the reverse direction, the one-way clutch 149 is connected and the rotation of the motor 142 is transmitted to the cam gear 153 via the motor gear 145, the pump gear 146, the intermediate gear 150, the intermediate gear 151, and the intermediate gear 152, so that the cam gear 153 rotates. Due to the rotation of the cam shaft 139, the cap cams 140A and 140B and the wiper cam 141 are lifted up or down at respective predetermined timings. Therefore, the recording head 20 can be capped and the nozzle surfaces can be wiped with the wiper blade 131. The nozzle surfaces of the recording head 20 can be wiped by lifting the wiper blade 131 up and moving the recording head 20 relative to the wiper blade 131.

As described above, the image forming apparatus 1 of the embodiment is configured to capture a subject by the imaging unit 60 mounted on the carriage 6 and calculates color measurement values of the subject. Therefore, while the imaging unit 60 is capturing the subject, it is impossible to locate the carriage 6 at the position of the maintenance mechanism 12 and to put the cap 130 of the maintenance mechanism 12 onto the recording head 20 mounted on the carriage 6. Namely, while the imaging unit 60 is capturing a subject, it is difficult to maintain the moist state of the nozzles by capping the recording head 20 and prevent a discharge failure due to dried ink.

A subject used as a color measurement target is mainly a plurality of patches contained in a test pattern that the image forming apparatus 1 has formed on the recording medium P. Therefore, the recording head 20 mounted on the carriage 6 is not capped by the cap 130 until the imaging unit 60 completes the capturing of a number of the patches. Therefore, in the image forming apparatus 1 according to the embodiment, to maintain the moist state of the nozzles without capping the recording head 20, the recording head 20 is caused to flush ink at a predetermined timing while the imaging unit 60 is capturing a number of the patches. The timing to flush ink from the recording head 20 may be at a time after a lapse of a predetermined time measured by a timer or the like, or may be changed according to an environment (for example, a temperature or the usage of the recording head 20).

When normal images or the color-measurement-adjustment color patches CP of the color measurement adjustment sheet CS are formed, as described above, mist is generated by ejecting ink from the recording head 20. Similarly, when the image forming apparatus 1 performs color adjustment (when the imaging unit 60 captures a subject), if the recording head 20 is caused to flush ink, mist is generated. Therefore, not only when normal images or the color-measurement-adjustment color patches CP of the color measurement adjustment sheet CS are formed but also when the color adjustment is performed by the image forming apparatus 1, if the recording head 20 is caused to flush ink, it is desirable for the imaging unit 60 to close the opening 32c by the shutter 61 to prevent the mist from entering the inside of the frame 32 via the opening 32c. Furthermore, it is desirable to move the shutter 61 to a position separated from the opening 32c so as to open the opening 32c and resume the capturing of a next patch after the ink has been flushed and a predetermined time that is determined in advance as a time needed until the mist settles has elapsed.

In this way, by causing the imaging unit 60 to close the opening 32c by the shutter 61 not only when normal images or the color-measurement-adjustment color patches CP of the color measurement adjustment sheet CS are formed but also when the recording head 20 mounted on the carriage 6 flushes ink, it becomes possible to more effectively prevent an imaging failure due to dirt on the inner components of the imaging unit 60, enabling to perform the color measurement process with higher accuracy.

Furthermore, in the image forming apparatus 1 according to the embodiment, it may be possible to slightly drive the carriage 6 in order to vibrate the recording head 20 while the imaging unit 60 is capturing a subject. Accordingly, it becomes possible to increase a time until the ink of the recording head 20 that is not being capped is dried. Therefore, it is possible to reduce the frequency of ink flushing.

Figure 34:
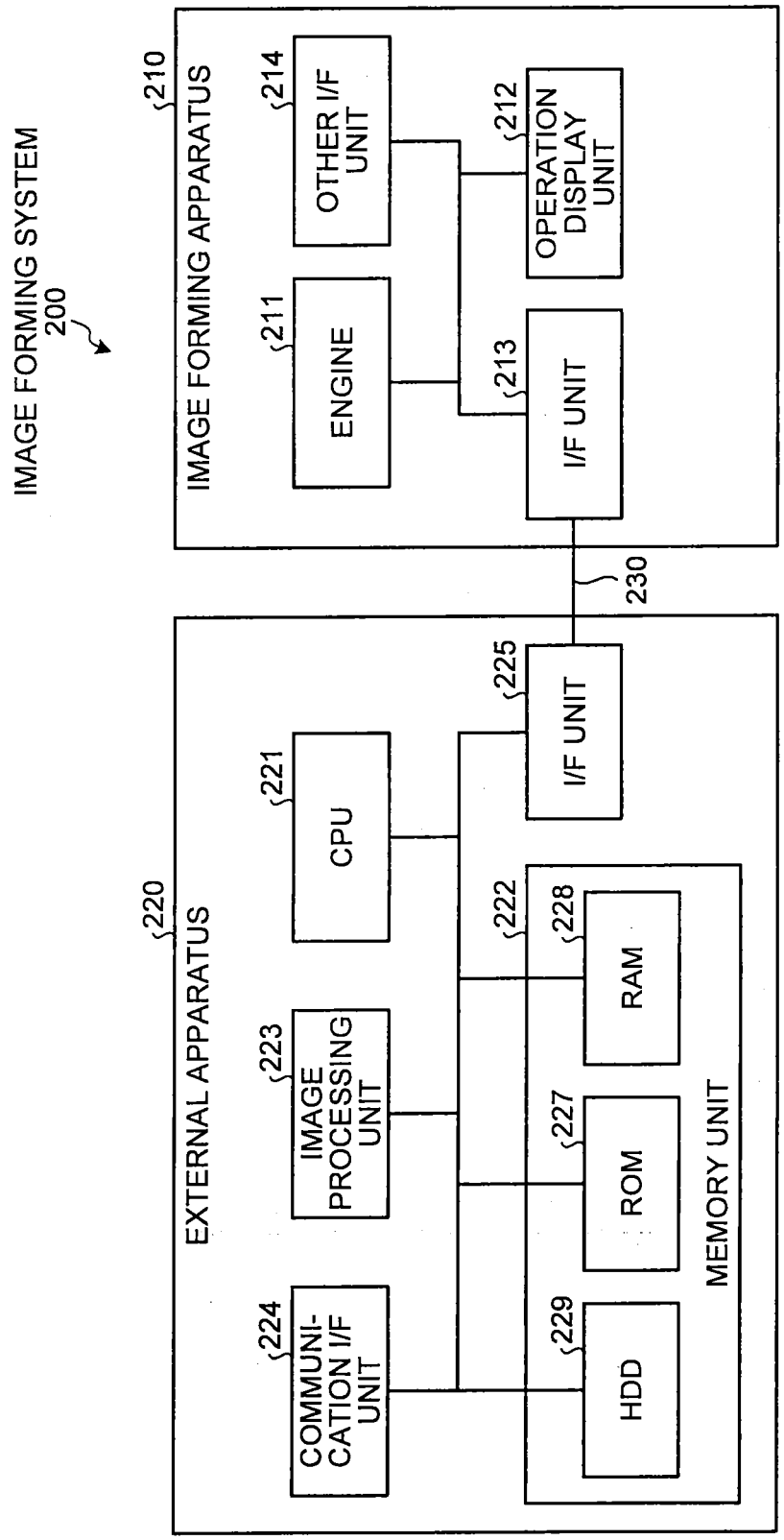
FIG. 34 is a system configuration diagram of an image forming system.

In the above embodiment, the color measurement control unit 106 of the image forming apparatus 1 performs the color measurement process. However, the color measurement process does not necessarily have to be performed by the image forming apparatus 1. For example, as an image forming system (a color measuring system) 200 as illustrated in FIG. 34, when an image forming apparatus 210 is connected to an external apparatus 220, image data captured by the image forming apparatus 210 may be output to the external apparatus 220, and the external apparatus 220 may perform the color adjustment process involving the color measurement process. In this case, the external apparatus 220 outputs the color-adjusted image data to the image forming apparatus 210, and the image forming apparatus 210 forms an image based on the image data obtained from the external apparatus 220.

Specifically, the image forming apparatus 210 includes an engine 211, an operation display unit 212, an I/F unit 213, and other I/F unit 214, all of which are connected to one another via a bus 215. As the external apparatus 220, for example, a computer with a normal hardware and software configuration may be used. By loading a color adjustment program including a color measurement program for executing the color adjustment process involving the color measurement process of the embodiment as software, the color adjustment process involving the color measurement process is performed. The external apparatus 220 includes a CPU 221, a memory unit 222, an image processing unit 223, a communication I/F unit 224, and an I/F unit 225, all of which are connected to one another via a bus 226. The memory unit 222 includes a ROM 227, a RAM 228, and a hard disk (HDD) 229.

The image forming apparatus 210 is connected to the external apparatus 220 by the I/F unit 213 via a line 230. The line 230 may be a network, such as a leased line or a LAN (Local Area Network), or the Internet, and may be a wired or wireless line.

The image forming apparatus 210 forms and outputs an image onto a recording medium by using the engine 211 based on the image data sent by the external apparatus 220 under the control of the external apparatus 220. The engine 211 forms an image on a recording medium by an inkjet method or the like. The operation display unit 212 includes various operation keys and a display, such as an LCD (Liquid Crystal Display). Various operations needed to operate the image forming apparatus 210 are performed via the operation keys, and various types of information to be notified to a user by the image forming apparatus 210 are displayed and output on the display. The other I/F unit 214 is used to connect an extended unit or the like.

The engine 211 includes a carriage that moves in the main-scanning direction in the same manner as in the embodiment described above. The imaging unit 30 explained above is mounted on the carriage. The image forming apparatus 210 generates the color measurement adjustment sheet CS by forming the color-measurement-adjustment color patches CP on a recording medium based on the color patch data of the color-measurement-adjustment color patches CP sent by the external apparatus 220 under the control of the CPU 221 of the external apparatus 220. The image forming apparatus 210 reads the color-measurement-adjustment color patches CP of the generated color measurement adjustment sheet CS by using the imaging unit 30, and transmits the read data to the external apparatus 220 via the I/F unit 213.

In the external apparatus 220, an image formation control program to control the operations of the image forming apparatus 210, a color adjustment program to perform the color adjustment process involving the color measurement process, and necessary data are stored in the hard disk 229 or the ROM 227. The CPU 221 controls the image forming apparatus 210 based on the programs stored in the ROM 227 or the hard disk 229, so that the image forming apparatus 210 is caused to perform a basic process and the color adjustment process involving the color measurement process of the embodiment.

The hard disk 229 stores therein the above programs and various types of data needed to perform the color adjustment process. In particular, the hard disk 229 stores therein at least one of the Lab value and the XYZ value, which are the color measurement result of the reference color patches KP arrayed in the reference sheet KS as explained in the above embodiment, the imaged reference RGB values obtained by reading the reference color patches KP of the reference sheet KS by the imaging unit 30 of the image forming apparatus 210, the reference-value linear transformation matrix, the neighboring point table, the selection-RGB-value linear transformation matrix, the initial reference RGB values RdGdBd of the color patches of the reference chart KC that is read together with the reference sheet KS, the color-measured reference RGB values RdsGdsBds of the reference color patches of the reference chart KC that is read together with the color-measurement-adjustment color patches CP of the color measurement adjustment sheet CS, and the inter-reference-RGB linear transformation matrix to convert the color-measured reference RGB values RdsGdsBds into the initial reference RGB values RdGdBd.

The communication I/F unit 224 is connected to an image processing apparatus, such as a scanner device, a multifunction peripheral, or other external apparatuses, via a line, such as a network, and receives image data of an image to be output by the image forming apparatus 210.

The image processing unit 223 performs various types of image processing on image data needed to form and output an image by the engine 211 of the image forming apparatus 210.

As described above, the CPU 221 controls operations of the image forming apparatus 210, causes the calculating unit 124 of the color measurement control unit 106, in particular, the color measurement value calculating unit 126, to perform the color measurement process to obtain the color measurement values, performs color adjustment on image data based on the color measurement values, and outputs the image data to the image forming apparatus 210.

In the image forming system 200 illustrated in FIG. 32, the external apparatus 220 controls the operations of the image forming apparatus 210. However, it may be possible to provide a controller, such as a CPU, in the image forming apparatus 210 such that the controller controls the image forming operation and the external apparatus 220 performs only the color measurement process to obtain the color measurement values or performs only the color adjustment process involving the color measurement process.

As described above, if the external apparatus of the image forming apparatus 210 performs at least the color measurement process or the color adjustment process involving the color measurement process, it becomes possible to appropriately improve the color reproducibility at low costs even in the inexpensive image forming apparatus 210.

According to an embodiment of the present invention, it is possible to stably capture a subject and the reference chart unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging unit comprising:
a casing having an opening;
a sensor unit that captures, from inside the casing via the opening, a subject located outside the casing;
a reference chart unit that is arranged on the casing and is captured by the sensor unit from inside the casing together with the subject; and
a cover member that covers the opening.

2. The imaging unit according to claim 1, wherein the cover member is configured to be manually moved between a first position where the cover member covers the opening and a second position separated from the opening.

3. The imaging unit according to claim 1, wherein
the cover member is arranged so as to move between a first position where the cover member covers the opening and a second position separated from the opening along a bottom surface of the casing where the opening is arranged, and
the imaging unit further includes
a moving unit that moves the cover member between the first position and the second position.

4. The imaging unit according to claim 3, wherein the moving unit includes
a biasing unit that is arranged on the bottom surface and applies a biasing force to the cover member toward the first position; and
a movement driving unit that moves the cover member toward the second position against the biasing force of the biasing unit.

5. The imaging unit according to claim 3, wherein
the imaging unit is mounted on a carriage on which a recording head for ejecting a recording material onto a recording medium is mounted,
the moving unit moves the cover member to the first position before the recording head ejects the recording material, and moves the cover member from the first position to the second position after a lapse of at least a predetermined time that is determined in advance as a time during which mist of the recording medium is scattered after the recording head has ejected the recording material.

6. The imaging unit according to claim 5, wherein
when the sensor unit sequentially captures a plurality of subjects, and the recording head ejects the recording material during a period from when the sensor unit captures a first subject to when the sensor unit captures a second subject,
the moving unit moves the cover member from the second position to the first position after the sensor unit captures the first subject, and moves the cover member from the first position to the second position after a lapse of at least a predetermined time since the recording head has ejected the recording material, and
the sensor unit captures the second subject after the cover member is moved to the second position.

7. The imaging unit according to claim 1, wherein the cover member is formed of a plurality of film members stacked one on top of the other so as to cover the opening, and the outermost film member is removed when the sensor unit captures a subject.

8. A color measuring device comprising:
a casing having an opening;
a sensor unit that captures, from inside the casing via the opening, a subject located outside the casing;
a reference chart unit that is arranged on the casing and that is captured by the sensor unit from inside the casing together with the subject;
a cover member that covers the opening; and
a calculating unit that calculates a color measurement value of the subject based on image data of the subject and the reference chart unit that are captured by the sensor unit.

9. An image forming apparatus comprising:
an image output unit that outputs an image onto a recording medium; and
the color measuring device according to claim 8, wherein
the color measuring device calculates a color measurement value of the image by using the image output by the image output unit as a subject, and
the image output unit outputs an image based on image data with colors that are adjusted by using the color measurement value after the color measuring device has calculated the color measurement value.

10. A color measuring system comprising:
the imaging unit according to claim 1; and
a calculating unit that calculates a color measurement value of the subject, wherein
the calculating unit calculates a color measurement value of the subject based on image data of the subject and the reference chart unit that are captured by the sensor unit of the imaging unit.

11. A color measuring method implemented by a color measuring device that includes a casing having an opening, a sensor unit, a reference chart unit, a cover member, and a calculating unit, the color measuring method comprising:
capturing, by the sensor unit from inside the casing, a subject located outside the casing via the opening covered by the cover member;
capturing, by the sensor unit from inside the casing, the reference chart unit arranged on the casing;
calculating, by the calculating unit, a color measurement value of the subject based on image data of the subject and the reference chart unit that are captured at the capturing.

* * * * *